United States Patent
Wang et al.

(10) Patent No.: US 11,405,606 B2
(45) Date of Patent: Aug. 2, 2022

(54) ERROR MITIGATION IN SUB-PICTURE BITSTREAM BASED VIEWPORT DEPENDENT VIDEO CODING

(71) Applicant: HUAWEI TECHNOLOGIES CO., LTD., Shenzhen (CN)

(72) Inventors: Ye-Kui Wang, San Diego, CA (US); Huameng Fang, Shenzhen (CN); Yuqun Fan, Shenzhen (CN); Jianle Chen, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/061,421

(22) Filed: Oct. 1, 2020

(65) Prior Publication Data
US 2021/0021815 A1    Jan. 21, 2021

Related U.S. Application Data

(63) Continuation of application No. PCT/US2019/024123, filed on Mar. 26, 2019.
(Continued)

(51) Int. Cl.
*H04N 19/105*    (2014.01)
*H04N 19/132*    (2014.01)
(Continued)

(52) U.S. Cl.
CPC .............. *H04N 19/105* (2014.11); *G06T 9/00* (2013.01); *G06T 19/006* (2013.01); *H04N 19/13* (2014.11);
(Continued)

(58) Field of Classification Search
CPC ........ G06T 19/006; G06T 9/00; H04N 19/105; H04N 19/119; H04N 19/13; H04N 19/132;
(Continued)

(56) References Cited

U.S. PATENT DOCUMENTS

| | | | |
|---|---|---|---|
| 2007/0086664 | A1 | 4/2007 | Kim et al. |
| 2012/0023250 | A1 | 1/2012 | Chen et al. |

(Continued)

OTHER PUBLICATIONS

Skupin, R., et al., "Temporal MCTS Coding Constraints Implementation," JCTVC-AC0038, 29th Meeting: Macao, CN, Oct. 19-25, 2017, 2 pages.
(Continued)

*Primary Examiner* — Francis Geroleo
(74) *Attorney, Agent, or Firm* — Conley Rose, P.C.

(57) ABSTRACT

A video coding mechanism for viewpoint dependent video coding is disclosed. The mechanism includes receiving a spherical video signal stitched from multiple directional video streams. The spherical video signal is mapped into a plurality of sub-picture video signals each containing a sequence of sub-pictures. The plurality of sub-picture video signals, are encoded as a plurality of sub-picture bitstreams, such that, when decoded at a decoder, a value of each sample in each sub-picture is identical to a value of a corresponding sample in a decoded entire picture composed from the sub-pictures. The plurality of sub-picture bitstreams are composed into a plurality of sub-picture tracks with an indication that the sub-picture tracks are conforming to a particular video profile. The sub-picture bitstreams are transmitted toward a decoder to support decoding and displaying virtual reality video viewport.

12 Claims, 14 Drawing Sheets

Related U.S. Application Data

(60) Provisional application No. 62/651,821, filed on Apr. 3, 2018.

(51) Int. Cl.

| | | |
|---|---|---|
| *H04N 19/46* | (2014.01) | |
| *H04N 19/159* | (2014.01) | |
| *H04N 19/176* | (2014.01) | |
| *H04N 19/597* | (2014.01) | |
| *H04N 19/70* | (2014.01) | |
| *G06T 9/00* | (2006.01) | |
| *G06T 19/00* | (2011.01) | |
| *H04N 19/13* | (2014.01) | |
| *H04N 19/139* | (2014.01) | |
| *H04N 19/167* | (2014.01) | |
| *H04N 19/172* | (2014.01) | |
| *H04N 19/436* | (2014.01) | |
| *H04N 19/44* | (2014.01) | |

(52) U.S. Cl.
CPC ......... *H04N 19/132* (2014.11); *H04N 19/139* (2014.11); *H04N 19/159* (2014.11); *H04N 19/167* (2014.11); *H04N 19/172* (2014.11); *H04N 19/176* (2014.11); *H04N 19/436* (2014.11); *H04N 19/44* (2014.11); *H04N 19/46* (2014.11); *H04N 19/597* (2014.11); *H04N 19/70* (2014.11)

(58) Field of Classification Search
CPC .. H04N 19/139; H04N 19/159; H04N 19/167; H04N 19/172; H04N 19/176; H04N 19/436; H04N 19/44; H04N 19/46; H04N 19/597; H04N 19/70
See application file for complete search history.

(56) References Cited

U.S. PATENT DOCUMENTS

| | | | |
|---|---|---|---|
| 2014/0003504 A1 | 1/2014 | Ugur et al. | |
| 2014/0086333 A1* | 3/2014 | Wang | H04N 21/8451 375/240.25 |
| 2014/0301464 A1 | 10/2014 | Wu et al. | |
| 2015/0016503 A1 | 1/2015 | Rapaka et al. | |
| 2015/0350659 A1 | 12/2015 | Auyeung et al. | |
| 2016/0381385 A1 | 12/2016 | Ugur | |
| 2017/0344843 A1* | 11/2017 | Wang | G06K 9/00744 |
| 2018/0176468 A1* | 6/2018 | Wang | H04N 5/23238 |
| 2018/0270287 A1* | 9/2018 | Ouedraogo | H04L 65/4084 |
| 2018/0276890 A1 | 9/2018 | Wang | |
| 2018/0277164 A1 | 9/2018 | Wang | |
| 2019/0174161 A1 | 6/2019 | Skupin et al. | |
| 2020/0053392 A1 | 2/2020 | Hannuksela | |
| 2021/0227231 A1* | 7/2021 | Hannuksela | H04N 19/167 |

OTHER PUBLICATIONS

Boyce, J., et al., "HEVC Additional Supplemental Enhancement Information (Draft 4)," JCTVC-AC1005v2, 29th Meeting: Macao, CN, Oct. 19-25, 2017, 56 pages.

Office Action dated Aug. 9, 2021, U.S. Appl. No. 17/061,405, 85786922US13, 12 pages.

Restriction Requirement dated Apr. 20, 2021, U.S. Appl. No. 17/061,405, 85786922US13, 6 pages.

Hannuksela, M., "[OMAF] Defects and Proposed Fixes," ISO/IEC JTC1/SC29/WG11; m42066, Jan. 17, 2018 XP030070408, 4 pages.

Hannuksela, M., et al., "Technology under Consideration on sub-picture composition track grouping for OMAF", ISO/IEC JTC1/SC29/WG11 MPEG2017/N17279, Dec. 18, 2017 XP030023939, 7 pages.

Wang, Y.K., et al., "[OMAF] Constraints on sub-picture tracks and sub-picture bitstreams", ISO/IEC JTC1/SC29/WG11 MPEG 2018/M42458, Apr. 7, 2018 XP030070797, 4 pages.

"Line Transmission of Non-Telephone Signals; Video Codec for Audiovisual Services at px64 kbits," ITU-T Recommendation H.261, Mar. 1993, 29 pages.

"Transmission of Non-Telephone Signals; Information Technology—Generic Coding of Moving Puctures and Associated Audio Information: Video," ITU-T Recommendation H.262, Jul. 1995, 211 pages.

"Series H: Audiovisual and Multimedia Systems Infrastructure of audiovisual services—Coding of moving video; Video coding for low bit rate communication," ITU-T Recommendation H.263, Jan. 2005, 226 pages.

"Series H: Audiovisual and Multimedia Systems Infrastructure of audiovisual services—Coding of moving video; Advanced video coding for generic audiovisual services," Recommendation ITU-T H.264, Jun. 2019, 836 pages.

Series H: Audiovisual and Multimedia Systems Infrastructure of audiovisual services—Coding of moving video; High efficiency video coding, Recommendation ITU-T H.265, Apr. 2013, 317 pages.

"Information technology—Coding of audio—visual objects Part 12: ISO base media file format," ISO/IEC 14496-12, Fifth Edition, Dec. 15, 2015, 248 pages.

"Information technology—Coding of audio—visual objects—Part 14: MP4 file format," ISO/IEC 14496-14, Second Edition, Nov. 2018, 22 pages.

"Information technology—Coding of audio—visual objects—Part 15: Advanced Video Coding (AVC) file format," ISO/IEC 14496-15, First Edition, Apr. 15, 2004, 29 pages.

"3rd Generation Partnership Project; Technical Specification Group Services and System Aspects; Transparent end-to-end packet switched streaming service (PSS); 3GPP file format (3GP); (Release 16)," 3GPP TS 26.244 V16.1.0, Sep. 2020, 68 pages.

\* cited by examiner

ERROR MITIGATION IN SUB-PICTURE BITSTREAM BASED VIEWPORT DEPENDENT VIDEO CODING

CROSS-REFERENCE TO RELATED APPLICATIONS

This application is a continuation of International Application No. PCT/US2019/024123 filed on Mar. 26, 2019, by Futurewei Technologies, Inc., and titled "Error Mitigation in Sub-Picture Bitstream Based Viewport Dependent Video Coding," which claims the benefit of U.S. Provisional Patent Application No. 62/651,821, filed Apr. 3, 2018 by Ye-Kui Wang, et al., and titled "Constraints For Lightweight Rewriting Of Multiple Sub-Picture Video Bitstreams Into One Video Bitstream," which is hereby incorporated by reference.

TECHNICAL FIELD

The present disclosure is generally related to video coding for Virtual Reality (VR), and is specifically related to error prevention when coding a VR picture bitstream as a plurality of sub-picture bitstreams to support viewport dependent video coding.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented in a video coding device. The method comprises receiving, at a processor of the video coding device, a spherical video signal stitched from multiple directional video signals. The method further comprises mapping, by the processor, the spherical video signal into a plurality of sub-picture video signals each containing a sequence of sub-pictures. The method further comprises encoding, by the processor, the plurality of sub-picture video signals as a plurality of sub-picture bitstreams, such that, when decoded at a decoder, a value of each sample in each sub-picture is identical to a value of a corresponding sample in a decoded entire picture composed from the sub-pictures. The method further comprises composing, by the processor, the plurality of sub-picture bitstreams into a plurality of sub-picture tracks, and indicating that the sub-picture tracks are conforming to a particular video profile. The method further comprises transmitting, by a transmitter of the video coding device, a set of the plurality of sub-picture tracks toward a decoder to support decoding and displaying a virtual reality video viewport. For example, an encoder may receive a Virtual Reality (VR) video sequence in a spherical shape and split the sequence into sub-picture streams. Each sub-picture stream may depict a sub-portion of the overall video sequence, and can be encoded separately. This may allow portions of the video that are not in view of the user or that are effectively background to be encoded at lower resolutions and/or not sent at all. This can create problems in inter-prediction related video coding processes when a sub-picture stream uses samples from an adjacent sub-picture stream. For example, the samples may not be present or may not include expected data due to out of order decoding, differences in resolutions, omission of some sub-picture streams, etc. The present embodiment ensures a value of each sample in each sub-picture at the encoder and at the decoder is identical to a value of a corresponding sample in a decoded entire picture composed from the sub-pictures.

Optionally, in any of the preceding aspects, another implementation of the aspect provides, wherein encoding the plurality of sub-picture video signals as the plurality of sub-picture bitstreams includes encoding, in part, via inter-prediction the sub-picture bitstreams by selecting, for each current sub-picture, only motion vectors that reference samples in the same sub-picture video signal as the current sub-picture. The present embodiment ensures that each sub-picture stream only references its own samples during inter-prediction. This ensures that each sub-picture stream can be decoded without reference to adjacent sub-picture streams, and hence inter-prediction related artifacts between sub-picture streams are avoided during presentation.

Optionally, in any of the preceding aspects, another implementation of the aspect provides, wherein the particular video profile is an High Efficiency Video Coding (HEVC)-based viewport-dependent Omnidirectional MediA Format (OMAF) video profile.

Optionally, in any of the preceding aspects, another implementation of the aspect provides, wherein selecting motion vectors that reference samples in the same sub-picture video signal as the current sub-picture includes selecting motion vectors that reference full sample locations in the same sub-picture video signal; and selecting motion vectors that reference fractional sample locations that employ only full sample locations inside the same sub-picture video signal for interpolation. Fractional sample locations (e.g., at the edge of the sub-picture stream) can be employed so long as they can be reconstructed by interpolation based solely on the common sub-picture stream samples.

Optionally, in any of the preceding aspects, another implementation of the aspect provides, wherein encoding the plurality of sub-picture video signals via inter-prediction further includes selecting, for each current sub-picture, only motion vector candidates from blocks in the same sub-picture video signal with the current sub-picture. Another source of error when merging sub-picture streams comes when applying merge mode based inter-prediction. Merge mode creates a list of candidate motion vectors and encodes the motion vector as an index into the candidate list. Error can occur when a candidate index is selected from an adjacent sub-picture stream as the selected candidate may not be available on decoding. This embodiment restricts motion vector candidates so they are only selected from the same sub-picture stream to avoid this problem.

Optionally, in any of the preceding aspects, another implementation of the aspect provides, wherein encoding the plurality of sub-picture video signals via inter-prediction further includes disabling wavefront parallel processing (WPP). HEVC uses tiles and WPP, but may not allow for them to be used together as WPP interferes with merging at the decoder. Tiles are used to split the video sequence into sub-picture streams, and hence WPP may be disabled to comply with HEVC.

Optionally, in any of the preceding aspects, another implementation of the aspect provides, wherein disabling WPP includes setting a entropy_coding_sync_enabled_flag to zero, where the entropy_coding_sync_enabled_flag is included in a picture parameter set (PPS) for the spherical video signal.

Optionally, in any of the preceding aspects, another implementation of the aspect provides, wherein the sub-picture tracks are constrained to include the same number of media samples per sub-picture track. Each sub-picture stream is included in a different track. In order to ensure the sub-picture streams can be merged at the decoder, the media samples are encoded/decoded at the same rate in each track. This allows the tracks to be merged without temporal mismatches.

Optionally, in any of the preceding aspects, another implementation of the aspect provides, wherein the sub-picture tracks are further constrained to include a common presentation time.

Optionally, in any of the preceding aspects, another implementation of the aspect provides, wherein the sub-picture tracks are further constrained such that media samples with the common presentation time are designated with a common picture order count value across the sub-picture tracks.

Optionally, in any of the preceding aspects, another implementation of the aspect provides, wherein mapping the spherical video signal into the plurality of sub-picture video signals includes setting a width and height for each sub-picture video signal, and wherein the width is an integer multiple of sixty four pixels, the width is greater than or equal to two hundred fifty six pixels, and the height is greater than or equal to two hundred fifty six pixels.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of the abovementioned aspects.

In an embodiment, the disclosure includes a video coding device comprising a processor configured to receive a spherical video signal stitched from multiple directional video signals. The processor is further configured to map the spherical video signal into a plurality of sub-picture video signals each containing a sequence of sub-pictures. The processor is further configured to encode the plurality of sub-picture video signals a plurality of sub-picture bitstreams, such that, when decoded at a decoder, a value of each sample in each sub-picture is identical to a value of a corresponding sample in a decoded entire picture composed from the sub-pictures. The processor is also configured to compose the plurality of sub-picture bitstreams into a plurality of sub-picture tracks, and indicating that the sub-picture tracks are conforming to a particular video profile. The video coding device also comprises a transmitter coupled to the processor, the transmitter configured to transmit a set of the plurality of sub-picture tracks toward a decoder to support decoding and displaying a virtual reality video viewport. For example, an encoder may receive a Virtual Reality (VR) video sequence in a spherical shape and split the sequence into sub-picture streams. Each sub-picture stream may depict a sub-portion of the overall video sequence, and can be encoded separately. This may allow portions of the video that are not in view of the user or that are effectively background to be encoded at lower resolutions and/or not sent at all. This can create problems in inter-prediction related video coding processes when a sub-picture stream uses samples from an adjacent sub-picture stream. For example, the samples may not be present or may not include expected data due to out of order decoding, differences in resolutions, omission of some sub-picture streams, etc. The present embodiment ensures a value of each sample in each sub-picture at the encoder and at the decoder is identical to a value of a corresponding sample in a decoded entire picture composed from the sub-pictures.

Optionally, in any of the preceding aspects, another implementation of the aspect provides, wherein encoding the plurality of sub-picture video signals as the plurality of sub-picture bitstreams includes encoding, in part, via inter-prediction the sub-picture bitstreams by selecting, for each current sub-picture, only motion vectors that reference samples in the same sub-picture video signal as the current sub-picture. The present embodiment ensures that each sub-picture stream only references its own samples during inter-prediction. This ensures that each sub-picture stream can be decoded without reference to adjacent sub-picture streams, and hence artifacts related to inter-prediction between sub-picture streams are avoided during presentation.

Optionally, in any of the preceding aspects, another implementation of the aspect provides, wherein the particular video profile is an HEVC-based viewport-dependent OMAF video profile.

Optionally, in any of the preceding aspects, another implementation of the aspect provides, wherein selecting motion vectors that reference samples in the same sub-picture video signal as the current sub-picture includes selecting motion vectors that reference full sample locations in the same sub-picture video signal; and selecting motion vectors that reference fractional sample locations that employ only full sample locations inside the same sub-picture video signal for interpolation. Fractional sample locations (e.g., at the edge of the sub-picture stream) can be employed so long as they can be reconstructed by interpolation based solely on the common sub-picture stream samples.

Optionally, in any of the preceding aspects, another implementation of the aspect provides, wherein encoding the plurality of sub-picture video signals via inter-prediction further includes selecting, for each current sub-picture, only motion vector candidates from blocks in the same sub-picture video signal with the current sub-picture. Error can occur when a candidate index is selected from an adjacent sub-picture stream as the selected candidate may not be available on decoding. This embodiment restricts motion vector candidates so they are only selected from the same sub-picture stream to avoid this problem.

Optionally, in any of the preceding aspects, another implementation of the aspect provides, wherein encoding the plurality of sub-picture video signals via inter-prediction further includes disabling WPP. HEVC uses tiles and WPP, but may not allow for them to be used together as WPP interferes with merging at the decoder. Tiles are used to split the video sequence into sub-picture streams, and hence WPP may be disabled to comply with HEVC.

Optionally, in any of the preceding aspects, another implementation of the aspect provides, wherein disabling WPP includes setting a entropy_coding_sync_enabled_flag to zero, where the entropy_coding_sync_enabled_flag is included in a PPS for the spherical video signal.

Optionally, in any of the preceding aspects, another implementation of the aspect provides, wherein the sub-picture tracks are constrained to include the same number of media samples per sub-picture track. Each sub-picture stream is included in a different track. In order to ensure the sub-picture streams can be merged at the decoder, the media samples are encoded/decoded at the same rate in each track. This allows the tracks to be merged without temporal mismatches.

Optionally, in any of the preceding aspects, another implementation of the aspect provides, wherein the sub-picture tracks are further constrained to include a common presentation time.

Optionally, in any of the preceding aspects, another implementation of the aspect provides, wherein the sub-picture tracks are further constrained such that media samples with the common presentation time are designated with a common picture order count value across the sub-picture tracks.

Optionally, in any of the preceding aspects, another implementation of the aspect provides, wherein mapping the spherical video signal into the plurality of sub-picture video signals includes setting a width and height for each sub-picture video signal, and wherein the width is an integer multiple of sixty four pixels, the width is greater than or equal to two hundred fifty six pixels, and the height is greater than or equal to two hundred fifty six pixels.

In an embodiment, the disclosure includes a video coding device comprising a video signal receiving means for receiving a spherical video signal stitched from multiple directional video signals. The video coding device also comprises a mapping means for mapping the spherical video signal into a plurality of sub-picture video signals each containing a sequence of sub-pictures. The video coding device also comprises an encoding means for encoding the plurality of sub-picture video signals as a plurality of sub-picture bitstreams such that, when decoded at a decoder, a value of each sample in each sub-picture is identical to a value of a corresponding sample in a decoded entire picture composed from the sub-pictures. The video coding device also comprises a composing means for composing the plurality of sub-picture bitstreams into a plurality of sub-picture tracks, and indicating that the sub-picture tracks are conforming to a particular video profile. The video coding device also comprises a transmitting means for transmitting a set of the plurality of sub-picture tracks toward a decoder to support decoding and displaying a virtual reality video viewport.

Optionally, in any of the preceding aspects, another implementation of the aspect provides, wherein the video stream receiving means, mapping means, encoding means, and transmitting means are further for performing the method of any of the abovementioned aspects.

Optionally, in any of the preceding aspects, another implementation of the aspect provides, wherein the constraints further include that sub-pictures carried in media samples with the same sample number across the tracks have the same picture order count value.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
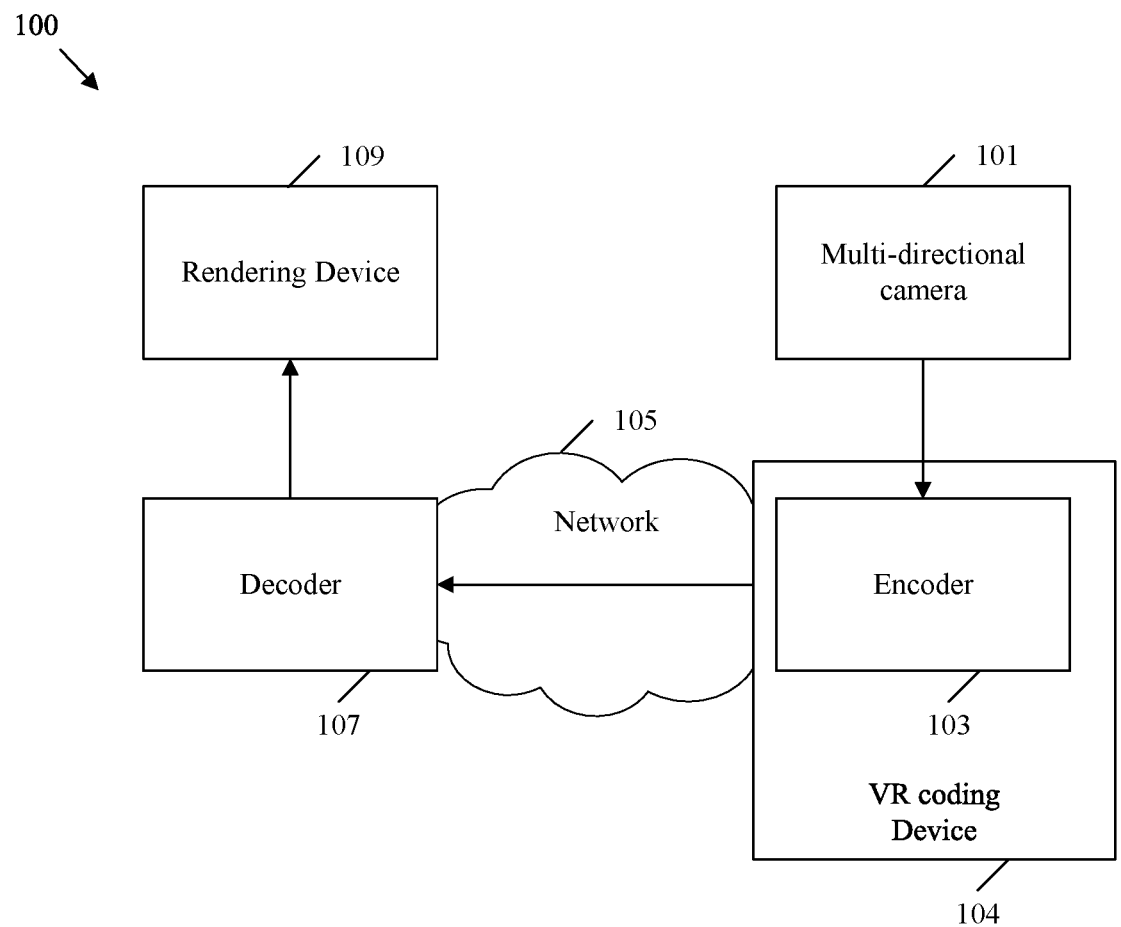
FIG. 1 is a schematic diagram of an example system for VR based video coding.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure is related to VR, which may also be known as omnidirectional media, immersive media, and three hundred sixty degree media. VR is an interactive recorded and/or computer-generated experience taking place within a simulated environment and employing visual, audio, and/or haptic feedback. For a visual perspective, VR provides a sphere (or sub-portion of a sphere) of imagery with a user positioned at the center of the sphere. The sphere of imagery can be rendered by a head mounted display (HMD). Specifically, the HMD provides the user with a field of view (FOV), also known as a viewport, of the sphere. Hence, the user can look through the viewport to see a sub-portion of the sphere and move the user's head to dynamically change the position of the viewport. This provides the impression of being positioned inside an environment defined by the sphere. The sphere can also be presented in an offset manner to each of the user's eyes in order to provide the sensation of a three dimensional space. Each picture, also known as a frame, includes both the area of the sphere inside the user's FOV and the area of the sphere outside the user's FOV. Hence, a VR frame includes significantly more data than a non-VR video image.

In order to generate a VR video stream, a multi-dimensional array of cameras simultaneously records the sphere from all relevant angles. This produces multiple directional video signals, which are combined to create a single spherical video signal for use as the VR video stream. In order to compress the VR video stream, each frame of the stream can be split into sub-pictures of a predefined shape, such as rectangular, square, or other shape. Such sub-pictures create sub-picture video signals, which can then be encoded and sent to a user for decoding, reconstruction into a VR video stream, and viewport based display to the user. One mechanism to ensure the reconstruction occurs properly involves encoding every sub-picture video signal at the same resolution. However, this can still result in a very large file.

Viewport dependent coding is an example compression technique that can further reduce the file size of the VR video stream (e.g., to support VR based video streaming). Viewport-dependent coding uses the concept that the user only views the portion of the sphere in the viewport at any time. Accordingly, the area outside of the user's FOV can be transmitted at lower resolutions (e.g., with resolution dropping farther away from the current FOV). The resolutions of the sub-picture video signals can be increased or decreased dynamically as the FOV moves, for example, by dynamically selecting different representations of the sub-picture video signals at different resolutions. This approach reduces the overall file size of the VR video stream by reducing the video quality of the areas of the sphere that the user cannot see (e.g., and/or is deemed to be background and of limited importance at the time of encoding).

Viewport dependent coding may suffer from video coding errors in some cases. For example, a video stream, such as a sub-picture video signal, can be coded by employing inter-prediction. In inter-prediction, a block of pixels (e.g., representing an object) occurring in multiple frames can be encoded as a motion vector pointing from a current block to another block in a different frame that includes the pixels. In this manner, a block occurring over multiple frames can be coded once (e.g., via intra-prediction) and then referenced by a series of motion vectors in order to reduce redundancy and hence file size. Inter-prediction employs multiple modes. Some modes, such as merge mode and advance motion vector prediction (AMVP) mode, generate a candidate list of motion vectors for a current block based on neighbor blocks. Such modes signal a selected motion vector by signaling an index from the candidate list. In this way, an entire block of pixels can be coded as a single index value. Inter-prediction using candidate lists can create problems in viewport dependent coding when applied to adjacent sub-picture video signals that include different resolutions and/or frame rates. Specifically, a candidate list for a block at the edge of a first sub-picture video signal may be dependent on motion vectors used at a corresponding edge of an adjacent second sub-picture video signal. When the first sub-picture video signal and the second sub-picture video signal are transmitted at different resolutions/frame rates, resolution related data mismatches may occur causing the candidate list to contain unexpected motion vector values (or omit expected values). This results in the decoder generating an incorrect candidate list, which results in a misinterpretation of the candidate list index. Misinterpretation of the candidate list index causes errors in the decoded sub-picture video signal, and hence errors in the VR video stream displayed to the user. Similar issues can occur if a motion vector in one sub-picture video signal references a sample in another sub-picture video signal, as that sample may be unavailable and/or of a reduced resolution. In addition, video codecs may employ wavefront parallel processing (WPP) to encode/decode blocks of a video image in parallel. However, WPP can have effects on block level coding mechanisms, and hence decoding different portions of an image at different resolutions according to WPP can cause additional errors.

Disclosed herein are mechanisms to mitigate errors caused by the use of candidate lists in inter-prediction when inter-prediction is applied to sub-picture video signals of a VR video stream coded according to viewport dependent coding mechanisms. For example, when a sub-picture video signal is encoded, a current block in a sub-picture of the sub-picture video signal can only reference reference samples in reference blocks at full sample locations in the same sub-picture video signal, and hence cannot reference full or fractional sample locations from other sub-picture video signals. This applies to both intra-prediction and inter-prediction. Further, fractional sample locations in a sub-picture video signal may be referenced, but only if the sample at the fractional sample location can be recreated by interpolation based solely on full and/or fractional sample locations inside the same sub-picture bitstream. Further, when performing inter-prediction, motion vectors from blocks in adjacent sub-picture bitstreams are not included in motion vector candidate lists. These restrictions ensures that each sub-picture bitstream can be decoded without reference to a neighbor sub-picture bitstream, and hence resolution based mismatches are avoided. Further, WPP may not be used in conjunction with sub-picture bitstreams. For example, a entropy_coding_sync_enabled_flag in each picture parameter set (PPS) may be set to zero to disable WPP for the sub-picture video signals. Also, timing mismatch issues between the sub-picture bitstreams can be avoided by ensuring tracks containing the sub-picture video signals have the same presentation time and ensuring each sample from a common VR picture employ the same picture order count value even when such samples are split into different sub-picture bitstreams and/or carried in different tracks.

FIG. 1 is a schematic diagram of an example system 100 for VR based video coding. System 100 includes a multi-directional camera 101, a VR coding device 104 including an encoder 103, a decoder 107, and a rendering device 109. The multi-directional camera 101 comprises an array of camera devices. Each camera device is pointed at a different angle so that the multi-directional camera 101 can take multiple directional video signals of the surrounding environment from a plurality of angles. For example, multi-directional camera 101 can take video of the environment as a sphere with the multi-directional camera 101 at the center of the sphere. As used herein, sphere and/or spherical video refer to both a geometrical sphere and sub-portions of a geometrical sphere, such as spherical caps, spherical domes, spherical segments, etc. For example, a multi-directional camera 101 may take a one hundred and eighty degree video to cover half of the environment so that the production crew can remain behind the multi-directional camera 101. A multi-directional camera 101 can also take video in three hundred sixty degrees (or any sub-portion thereof). However, a portion of the floor under the multi-directional camera 101 may be omitted, which results in video of less than a perfect sphere. Hence, the term sphere, as used herein, is a general term used for clarity of discussion and should not be considered limiting from a geometrical stand point.

Video from the multi-directional camera 101 is forwarded to the VR coding device 104. A VR coding device 104 may be a computing system including specialized VR coding software. The VR coding device 104 may include an encoder 103. In some examples, the encoder 103 can also be included in a separate computer system from the VR coding device 104. The VR coding device 104 is configured to convert the multiple directional video signals into a single multiple directional video signal including the entire recorded area from all relevant angles. This conversion may be referred to as image stitching. For example, frames from each video stream that are captured at the same time can be stitched together to create a single spherical image. A spherical video signal can then be created from the spherical images. For clarity of discussion, it should be noted that the terms frame, picture, and image may be interchangeably herein unless specifically noted.

The spherical video signal can then be forwarded to the encoder 103 for compression. An encoder 103 is a device and/or program capable of converting information from one format to another for purposes of standardization, speed, and/or compression. Standardized encoders 103 are configured to encode rectangular and/or square images. Accordingly, the encoder 103 is configured to map each spherical image from the spherical video signal into a plurality of sub-pictures in a predefined shape, such as rectangular, square, or other two dimensional geometric shape. While the spherical image may be mapped into sub-pictures of any shape, the sub-pictures may be referred to below as rectangular for purposes of clarity and brevity. However, such a rectangular shape should not be considered limiting absent contextual indications to the contrary. Upon completion of the mapping, the sub-pictures can be placed in separate sub-picture video signals. As such, each sub-picture video signal displays a stream of images over time as recorded from a sub-portion of the spherical video signal. The encoder 103 can then encode each sub-picture video signal to compress the video stream to a manageable file size. The encoding process is discussed in more detail below. In general, the encoder 103 partitions each frame from each sub-picture video signal into pixel blocks, compresses the pixel blocks by inter-prediction and/or intra-prediction to create coding blocks including prediction blocks and residual blocks, applies transforms to the residual blocks for further compression, and applies various filters to the blocks. The compressed blocks as well as corresponding syntax are stored in bitstream(s), for example in International Standardization Organization base media file format (ISOBMFF) and/or in omnidirectional media format (OMAF).

The VR coding device 104 may store the encoded bitstream(s) in memory, locally and/or on a server, for communication to a decoder 107 on demand. The data can be forwarded via a network 105, which may include the Internet, a mobile telecommunications network (e.g., a long term evolution (LTE) based data network), or other data communication data system.

The decoder 107 is a device at a user's location that is configured to reverse the coding process to reconstruct the sub-picture video signals from the encoded bitstream(s). The decoder 107 also merges the sub-picture video signals to reconstruct the spherical video signal. The spherical video signal, or sub-portions thereof, can then be forwarded to the rendering device 109. The rendering device 109 is a device configured to display the spherical video signal to the user. For example, the rendering device 109 may include a HMD that is attached to the user's head and covers the user's eyes. The rendering device 109 may include a screen for each eye, cameras, motion sensors, speakers, etc. and may communicate with the decoder 107 via wireless and/or wired connections. The rendering device 109 may display a sub-portion of the spherical video signal to the user. The sub-portion shown is based on the FOV and/or viewport of the rendering device. For example, the rendering device 109 may change the position of the FOV based on user head movement by employing the motion tracking sensors. This allows the user to see different portions of the spherical video signal depending on head movement. Further, the rendering device 109 may offset the FOV for each eye based on the user's interpupillary distance (IPD) to create the impression of a three dimensional space.

Figure 2:
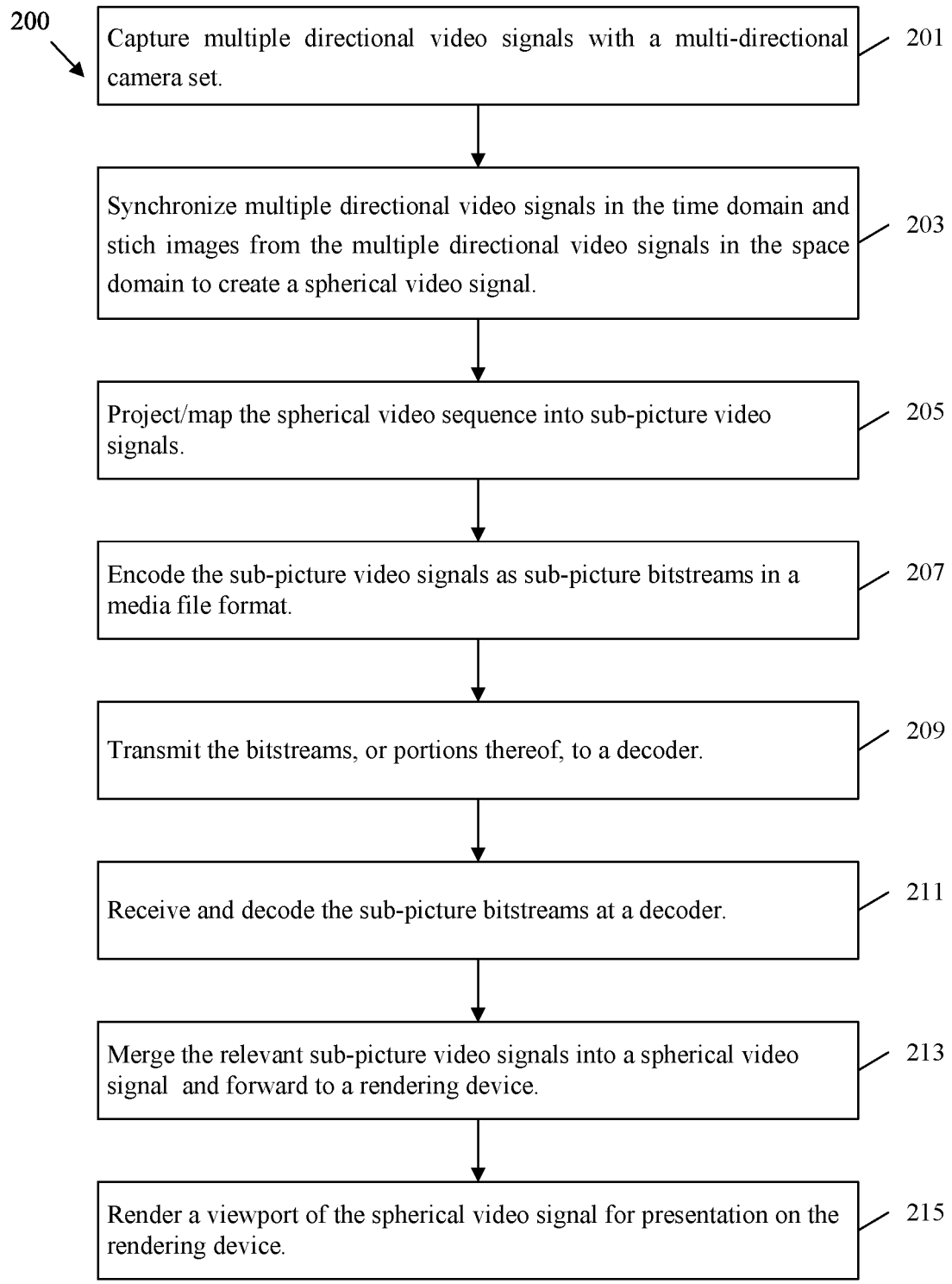
FIG. 2 is a flowchart of an example method of coding a VR picture bitstream as a plurality of sub-picture bitstreams.

FIG. 2 is a flowchart of an example method 200 of coding a VR picture bitstream as a plurality of sub-picture bitstreams, for example by employing the components of system 100. At step 201, a multi-directional camera set, such as multi-directional camera 101, is used to capture multiple directional video signals. The multiple directional video signals include views of an environment at various angles. For example, the multiple directional video signals may capture video from three hundred sixty degrees, one hundred eighty degrees, two hundred forty degrees, etc. around the camera in a plane (e.g., the horizontal plane). The multiple directional video signals may also capture video from three hundred sixty degrees, one hundred eighty degrees, two hundred forty degrees, etc. around the camera in the vertical plane. The result is to create video that includes information sufficient to cover a spherical area around the camera over some period of time.

At step 203, the multiple directional video signals are synchronized in the time domain. Specifically, each directional video stream includes a series of images taken at a corresponding angle. The multiple directional video signals are synchronized by ensuring frames from each directional video stream that were captured at the same time domain position are processed together. The frames from the directional video streams can then be stitched together in the space domain to create a spherical video signal. Hence, each frame of the spherical video signal contains data taken from the frames of all the directional video streams that occur at a common temporal position.

At step 205, the spherical video signal is mapped into sub-picture video signals (e.g., rectangular, square, etc.) This process may also be referred to as projecting the spherical video signal into rectangular sub-picture video signals. As noted above, encoders and decoders are generally designed to encode rectangular and/or square frames. Accordingly, mapping the spherical video signal into sub-picture video signals creates video streams that can be encoded and decoded by non-VR specific encoders and decoders, respectively. It should be noted that steps 203 and 205 are specific to VR video processing, and hence may be performed by specialized VR hardware, software, or combinations thereof.

At step 207, the rectangular sub-picture video signals can be forwarded to an encoder, such as encoder 103. The encoder then encodes the sub-picture video signals as sub-picture bitstreams in a corresponding media file format. Specifically, each sub-picture video signal can be treated by the encoder as a video signal. The encoder can encode each frame of each sub-picture video signal via inter-prediction, intra-prediction, etc. Such encoding and corresponding decoding as well as encoders and decoders are discussed in detail with respect to FIGS. 3-14 below. Regarding file format, the sub-picture video signals can be stored in ISOBMFF. For example, the sub-picture video signals are captured at a specified resolution. The sub-picture video signals can then be downsampled to various lower resolutions for encoding. Each resolution can be referred to as a representation. Lower quality representations lose image clarity while reducing file size. Accordingly, lower quality representations can be transmitted to a user using fewer network resources (e.g., time, bandwidth, etc.) than higher quality representations with an attendant loss of visual quality. Each representation can be stored in a corresponding set of tracks. Hence, tracks can be sent to a user, where the tracks include the sub-picture bitstreams at various resolutions (e.g., visual quality).

At step 209, the sub-picture bitstreams can be sent to the decoder as tracks. In some examples, all sub-picture bitstreams are transmitted at the same quality by transmitting tracks from the same representation. The downside to this approach is that areas of the final VR video stream that are of less concern are transmitted at the same resolution as all other areas. Viewport dependent coding can be used to improve compression over such an approach. In viewport dependent coding, the tracks containing sub-picture bitstreams with data in the users FOV are sent at higher resolutions by selecting higher quality representations. Tracks containing sub-picture bitstreams with areas outside the users FOV can be sent at progressively lower resolutions by selecting lower quality representations. Some areas may even be completely omitted in some examples. For example, areas adjacent to the FOV can be sent at slightly reduced quality in case the user decided to change the FOV to include such areas. Areas farther away from the FOV can be sent at progressively lower quality as such areas are progressively more unlikely to enter the FOV and hence are progressively more unlikely to ever be rendered for the user. The tracks may include relatively short video segments (e.g., about three seconds), and hence the representations selected for particular areas of the video can change over time based on changes in the FOV. This allows quality to change as the users FOV changes. Viewport dependent coding may significantly reduce the file size of the tracks sent to the user without significant losses in visual quality because the areas of reduced quality are unlikely to be seen by the user.

At step 211, a decoder, such as decoder 107, receives the tracks containing the sub-picture bitstreams. The decoder can then decode the sub-picture bitstreams into sub-picture video signals for display. The decoding process involves the reverse of the encoding process (e.g., using inter-prediction and intra-prediction), and is discussed in more detail with respect to FIGS. 3-14 below.

At step 213, the decoder can merge the sub-picture video signals into the spherical video signal for presentation to the user. Specifically, the decoder can employ a so called lightweight merging algorithm that selects frames from each sub-picture video signal that occur at the same presentation time and merges them together based on the position and/or angle associated with the corresponding sub-picture video signal. The decoder may also employ filters to smooth edges between the sub-picture video signals, remove artifacts, etc. The decoder can then forward the spherical video signal to a rendering device, such as rendering device 109.

At step 215, the rendering device renders a viewport of the spherical video signal for presentation to the user. As mentioned above, areas of the spherical video signal outside of the FOV at each point in time are not rendered. Hence, in viewport dependent coding, lower quality representations are effectively omitted, and hence the reduction in viewing quality has a negligible impact on user experience while reducing file size.

Viewport dependent coding, as applied to system 100 and method 200 decreases file sizes without significant loss of visual quality for the user. However, this approach may cause certain video coding errors in some cases. Specifically, inter-prediction and intra-prediction that extends over the boundaries of the sub-picture video signals may create artifacts when the sub-picture video signals are of different representations. This is because lower quality representations are lossy and omit data to reduce file size. A high quality sub-picture video signal may encode pixels based on data that is removed from adjacent lower quality sub-picture video signals. As such, the high quality sub-picture video signals may be decoded incorrectly when such data has been removed from the adjacent lower quality sub-picture video signals. The present disclosure includes mechanisms to constrain the encoding of sub-picture video signals to ensure each sub-picture video signal is self-contained, and hence such errors do not occur when the lightweight merging algorithm is applied at the decoder. FIGS. 3-10 describe encoding processes and systems applied to each sub-picture video signal and FIGS. 11-13 further describe constraints that can be applied to avoid such artifacts.

Figure 3:
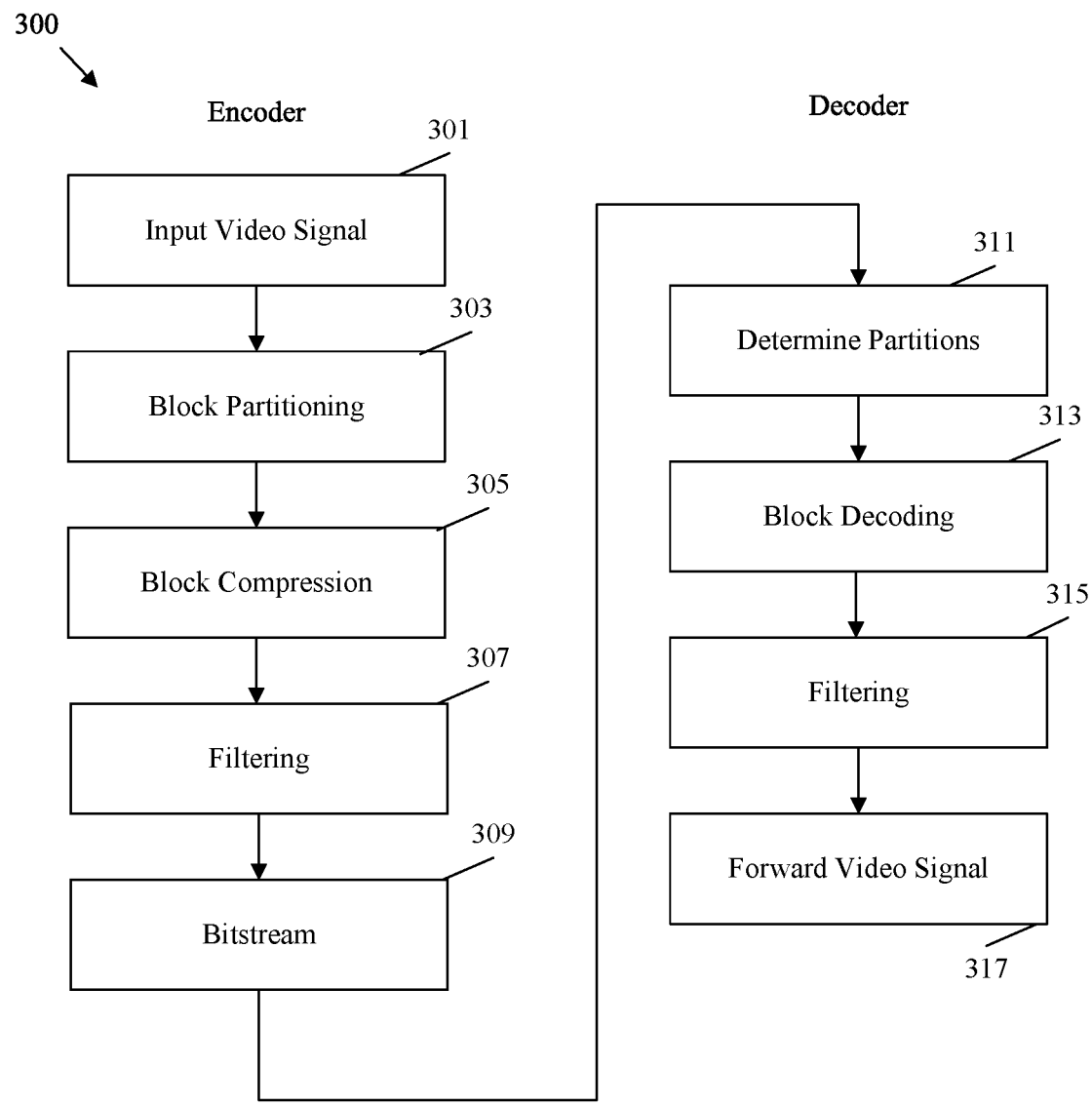
FIG. 3 is a flowchart of an example method of coding a video signal including a sub-picture video signal.

FIG. 3 is a flowchart of an example method 300 of coding a video signal including a sub-picture video signal. For example, method 300 may receive a plurality of sub-picture video signals from step 205 of method 200. Method 300 treats each sub-picture video signal as a video signal input. Method 300 applies steps 301-317 to each sub-picture video signal in order to implement steps 207-211 of method 200. Hence, the output video signal from method 300 includes the decoded sub-picture video signals, which can be merged and displayed according to steps 213 and 215 of method 200.

Method 300 encodes a video signal, for example including sub-picture video signals, at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 301, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples).

At step 303, the video signal is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty four pixels by sixty four pixels). The CTUs contain both luma and chroma samples. As used herein, a sample, also known as pixel, is a value of an image (e.g., a luminance/light value or chrominance/color value) at a corresponding location. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 305, various compression mechanisms are employed to compress the image blocks partitioned at step 303. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement, or lack thereof. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 307, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 309. The bitstream includes the data discussed above as well as any signaling data (e.g., syntax) desired to support proper video signal reconstruction at the decoder. For example, such data may include partition data, prediction data, residual blocks, and various flags providing coding instructions to the decoder. The bitstream may be stored in memory for transmission toward a decoder upon request, for example as a track and/or track fragment in ISBBMFF. The bitstream may also be broadcast and/or multicast toward a plurality of decoders. The creation of the bitstream is an iterative process. Accordingly, steps 301, 303, 305, 307, and 309 may occur continuously and/or simultaneously over many frames and blocks. The order shown in FIG. 3 is presented for clarity and ease of discussion, and is not intended to limit the video coding process to a particular order.

The decoder receives the bitstream and begins the decoding process at step 311. For example, the decoder can employ an entropy decoding scheme to convert the bitstream into corresponding syntax and video data. The decoder employs the syntax data from the bitstream to determine the partitions for the frames at step 311. The partitioning should match the results of block partitioning at step 303. Entropy encoding/decoding, which may be employed in step 311, is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 313, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 305. The reconstructed image blocks are then positioned into frames of a reconstructed video signal according to the partitioning data determined at step 311. Syntax for step 313 may also be signaled in the bitstream via entropy coding as discussed above.

At step 315, filtering is performed on the frames of the reconstructed video signal in a manner similar to step 307 at the encoder. For example, noise suppression filters, de-blocking filters, adaptive loop filters, and SAO filters may be applied to the frames to remove blocking artifacts. Once the frames are filtered, the video signal can be forwarded for merging at step 317 and then output to a display, such as a HMD, for viewing by an end user.

The present disclosure relates to modifications to prevent artifacts when sub-picture video signals from a VR video stream are encoded at a particular resolution and then decoded at varying resolutions according to viewport dependent coding. Such artifacts occur due to mechanisms in block compression at step 305. Hence, the present disclosure improves the functionality of block compression at step 305 at the encoder and block decoding at step 313 at the decoder. This results in a reduced file size, and hence increased coding efficiency, and/or results in increased visual quality of the resulting decoded VR video stream at the decoder.

Figure 4:
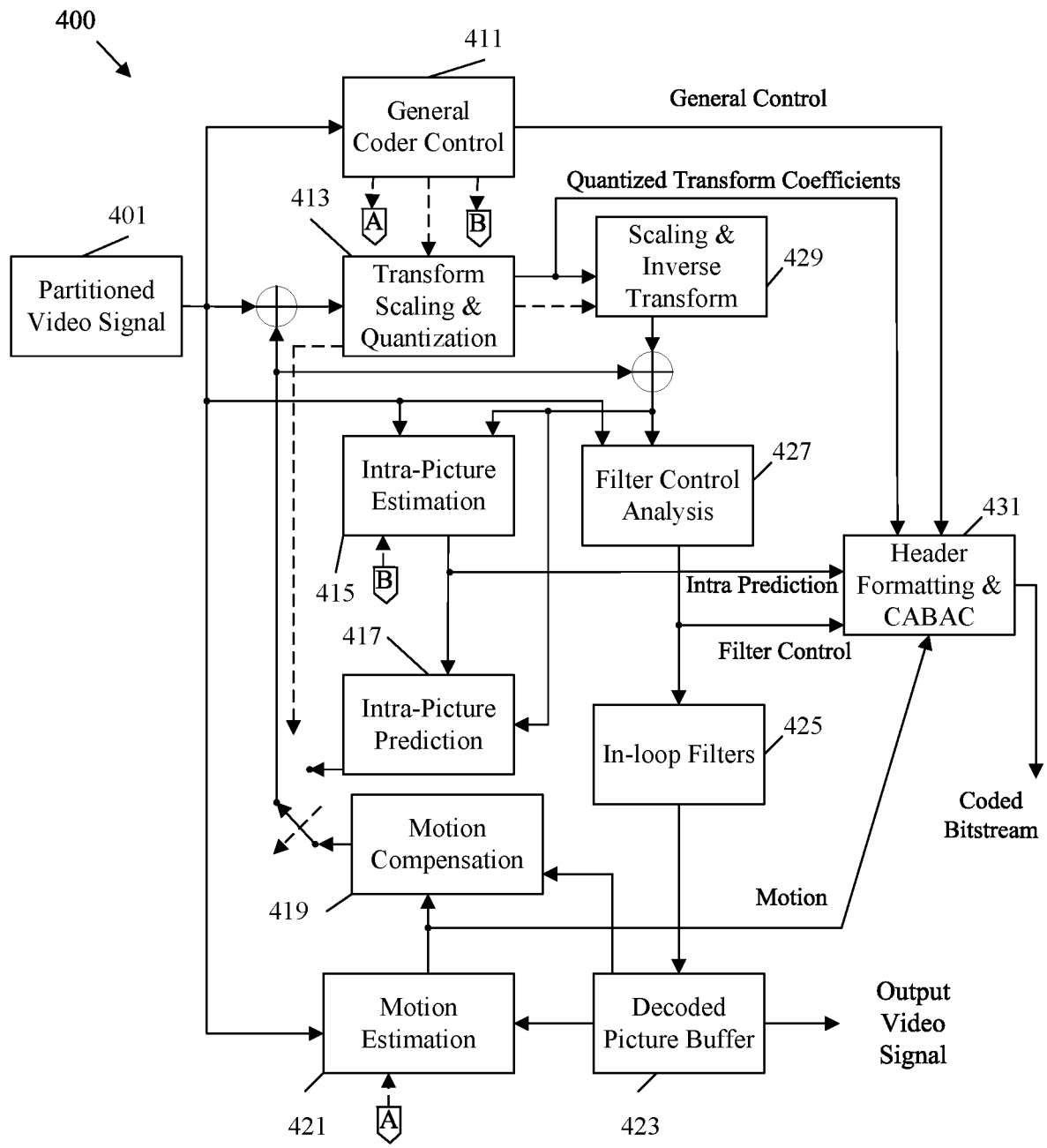
FIG. 4 is a schematic diagram of an example coding and decoding (codec) system for video coding.

FIG. 4 is a schematic diagram of an example coding and decoding (codec) system 400 for video coding. Specifically, codec system 400 provides functionality to support encoding and decoding sub-picture video signals according to methods 200 and 300. Further, codec system 400 can be employed to implement an encoder 103 and/or a decoder 107 of system 100.

Codec system 400 is generalized to depict components employed in both an encoder and a decoder. Codec system 400 receives and partitions frames to form a video signal (e.g., including a sub-picture video signal) as discussed with respect to steps 301 and 303 in operating method 300, which results in partitioned video signals 401. Codec system 400 then compresses the partitioned video signals 401 into a coded bitstream when acting as an encoder as discussed with respect to steps 305, 307, and 309 in method 300. When acting as a decoder, codec system 400 generates an output video signal from the bitstream as discussed with respect to steps 311, 313, 315, and 317 in operating method 300. The codec system 400 includes a general coder control component 411, a transform scaling and quantization component 413, an intra-picture estimation component 415, an intra-picture prediction component 417, a motion compensation component 419, a motion estimation component 421, a scaling and inverse transform component 429, a filter control analysis component 427, an in-loop filters component 425, a decoded picture buffer component 423, and a header formatting and context adaptive binary arithmetic coding (CABAC) component 431. Such components are coupled as shown. In FIG. 4, black lines indicate movement of data to be encoded/decoded while dashed lines indicate movement of control data that controls the operation of other components. The components of codec system 400 may all be present in the encoder. The decoder may include a subset of the components of codec system 400. For example, the decoder may include the intra-picture prediction component 417, the motion compensation component 419, the scaling and inverse transform component 429, the in-loop filters component 425, and the decoded picture buffer component 423. These components are now described.

The partitioned video signal 401 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 401 is forwarded to the general coder control component 411, the transform scaling and quantization component 413, the intra-picture estimation component 415, the filter control analysis component 427, and the motion estimation component 421 for compression.

The general coder control component 411 is configured to make decisions related to coding of the images of the video sequence into the bitstream according to application constraints. For example, the general coder control component 411 manages optimization of bitrate/bitstream size versus reconstruction quality. Such decisions may be made based on storage space/bandwidth availability and image resolution requests. The general coder control component 411 also manages buffer utilization in light of transmission speed to mitigate buffer underrun and overrun issues. To manage these issues, the general coder control component 411 manages partitioning, prediction, and filtering by the other components. For example, the general coder control component 411 may dynamically increase compression complexity to increase resolution and increase bandwidth usage or decrease compression complexity to decrease resolution and bandwidth usage. Hence, the general coder control component 411 controls the other components of codec system 400 to balance video signal reconstruction quality with bit rate concerns. The general coder control component 411 creates control data, which controls the operation of the other components. The control data is also forwarded to the header formatting and CABAC component 431 to be encoded in the bitstream to signal parameters for decoding at the decoder.

The partitioned video signal 401 is also sent to the motion estimation component 421 and the motion compensation component 419 for inter-prediction. A frame or slice of the partitioned video signal 401 may be divided into multiple video blocks. Motion estimation component 421 and the motion compensation component 419 perform inter-predictive coding of the received video block relative to one or more blocks in one or more reference frames to provide temporal prediction. Codec system 400 may perform multiple coding passes, e.g., to select an appropriate coding mode for each block of video data.

Motion estimation component 421 and motion compensation component 419 may be highly integrated, but are illustrated separately for conceptual purposes. Motion estimation, performed by motion estimation component 421, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel differences may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 421 generates motion vectors, PUs, and TUs by using a rate-distortion analysis as part of a rate distortion optimization process. For example, the motion estimation component 421 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 400 may calculate values for sub-integer pixel positions of reference pictures stored in decoded picture buffer component 423. For example, video codec system 400 may interpolate values of one-quarter pixel positions, one-eighth pixel positions, or other fractional pixel positions of the reference picture. Therefore, motion estimation component 421 may perform a motion search relative to the full pixel positions and fractional pixel positions and output a motion vector with fractional pixel precision. The motion estimation component 421 calculates a motion vector for a PU of a video block in an inter-coded slice by comparing the position of the PU to the position of a predictive block of a reference picture. Motion estimation component 421 outputs the calculated motion vector as motion data to header formatting and CABAC component 431 for encoding and motion to the motion compensation component 419.

Motion compensation, performed by motion compensation component 419, may involve fetching or generating the predictive block based on the motion vector determined by motion estimation component 421. Again, motion estimation component 421 and motion compensation component 419 may be functionally integrated, in some examples. Upon receiving the motion vector for the PU of the current video block, motion compensation component 419 may locate the predictive block to which the motion vector points. A residual video block is then formed by subtracting pixel values of the predictive block from the pixel values of the current video block being coded, forming pixel difference values. In general, motion estimation component 421 performs motion estimation relative to luma components, and motion compensation component 419 uses motion vectors calculated based on the luma components for both chroma components and luma components. The predictive block and residual block are forwarded to transform scaling and quantization component 413.

The partitioned video signal 401 is also sent to intra-picture estimation component 415 and intra-picture prediction component 417. As with motion estimation component 421 and motion compensation component 419, intra-picture estimation component 415 and intra-picture prediction component 417 may be highly integrated, but are illustrated separately for conceptual purposes. The intra-picture estimation component 415 and intra-picture prediction component 417 intra-predict a current block relative to blocks in a current frame, as an alternative to the inter-prediction performed by motion estimation component 421 and motion compensation component 419 between frames, as described above. In particular, the intra-picture estimation component 415 determines an intra-prediction mode to use to encode a current block. In some examples, intra-picture estimation component 415 selects an appropriate intra-prediction mode to encode a current block from multiple tested intra-prediction modes. The selected intra-prediction modes are then forwarded to the header formatting and CABAC component 431 for encoding.

For example, the intra-picture estimation component 415 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 415 calculates ratios from the distortions and rates for the various encoded blocks to determine which intra-prediction mode exhibits the best rate-distortion value for the block. In addition, intra-picture estimation component 415 may be configured to code depth blocks of a depth map using a depth modeling mode (DMM) based on rate-distortion optimization (RDO).

The intra-picture prediction component 417 may generate a residual block from the predictive block based on the selected intra-prediction modes determined by intra-picture estimation component 415 when implemented on an encoder or read the residual block from the bitstream when implemented on a decoder. The residual block includes the difference in values between the predictive block and the original block, represented as a matrix. The residual block is then forwarded to the transform scaling and quantization component 413. The intra-picture estimation component 415 and the intra-picture prediction component 417 may operate on both luma and chroma components.

The transform scaling and quantization component 413 is configured to further compress the residual block. The transform scaling and quantization component 413 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 413 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 413 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 413 may then perform a scan of the matrix including the quantized transform coefficients. The quantized transform coefficients are forwarded to the header formatting and CABAC component 431 to be encoded in the bitstream.

The scaling and inverse transform component 429 applies a reverse operation of the transform scaling and quantization component 413 to support motion estimation. The scaling and inverse transform component 429 applies inverse scaling, transformation, and/or quantization to reconstruct the residual block in the pixel domain, e.g., for later use as a reference block which may become a predictive block for another current block. The motion estimation component 421 and/or motion compensation component 419 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 427 and the in-loop filters component 425 apply the filters to the residual blocks and/or to reconstructed image blocks. For example, the transformed residual block from the scaling and inverse transform component 429 may be combined with a corresponding prediction block from intra-picture prediction component 417 and/or motion compensation component 419 to reconstruct the original image block. The filters may then be applied to the reconstructed image block. In some examples, the filters may instead be applied to the residual blocks. As with other components in FIG. 4, the filter control analysis component 427 and the in-loop filters component 425 are highly integrated and may be implemented together, but are depicted separately for conceptual purposes. Filters applied to the reconstructed reference blocks are applied to particular spatial regions and include multiple parameters to adjust how such filters are applied. The filter control analysis component 427 analyzes the reconstructed reference blocks to determine where such filters should be applied and sets corresponding parameters. Such data is forwarded to the header formatting and CABAC component 431 as filter control data for encoding. The in-loop filters component 425 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 423 for later use in motion estimation as discussed above. When operating as a decoder, the decoded picture buffer component 423 stores and forwards the reconstructed and filtered blocks toward a display as part of an output video signal. The decoded picture buffer component 423 may be any memory device capable of storing prediction blocks, residual blocks, and/or reconstructed image blocks.

The header formatting and CABAC component 431 receives the data from the various components of codec system 400 and encodes such data into a coded bitstream for transmission toward a decoder. Specifically, the header formatting and CABAC component 431 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 401. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

The present disclosure includes modifications to prevent artifacts when sub-picture video signals from a VR video stream are encoded at a particular resolution and then decoded at varying resolutions according to viewport dependent coding. Such artifacts occur due to mechanisms in intra-prediction according to intra-picture estimation component 415 and/or intra-picture prediction component 417 and inter-prediction according to a motion compensation component 419 and/or a motion estimation component 421. Hence, the present disclosure improves the functionality of intra-picture estimation component 415, intra-picture prediction component 417, motion compensation component 419, and/or a motion estimation component 421 at an encoder and/or decoder. This results in a reduced file size, and hence increased coding efficiency, and/or results in increased visual quality of the resulting decoded VR video stream at the decoder.

Figure 5:
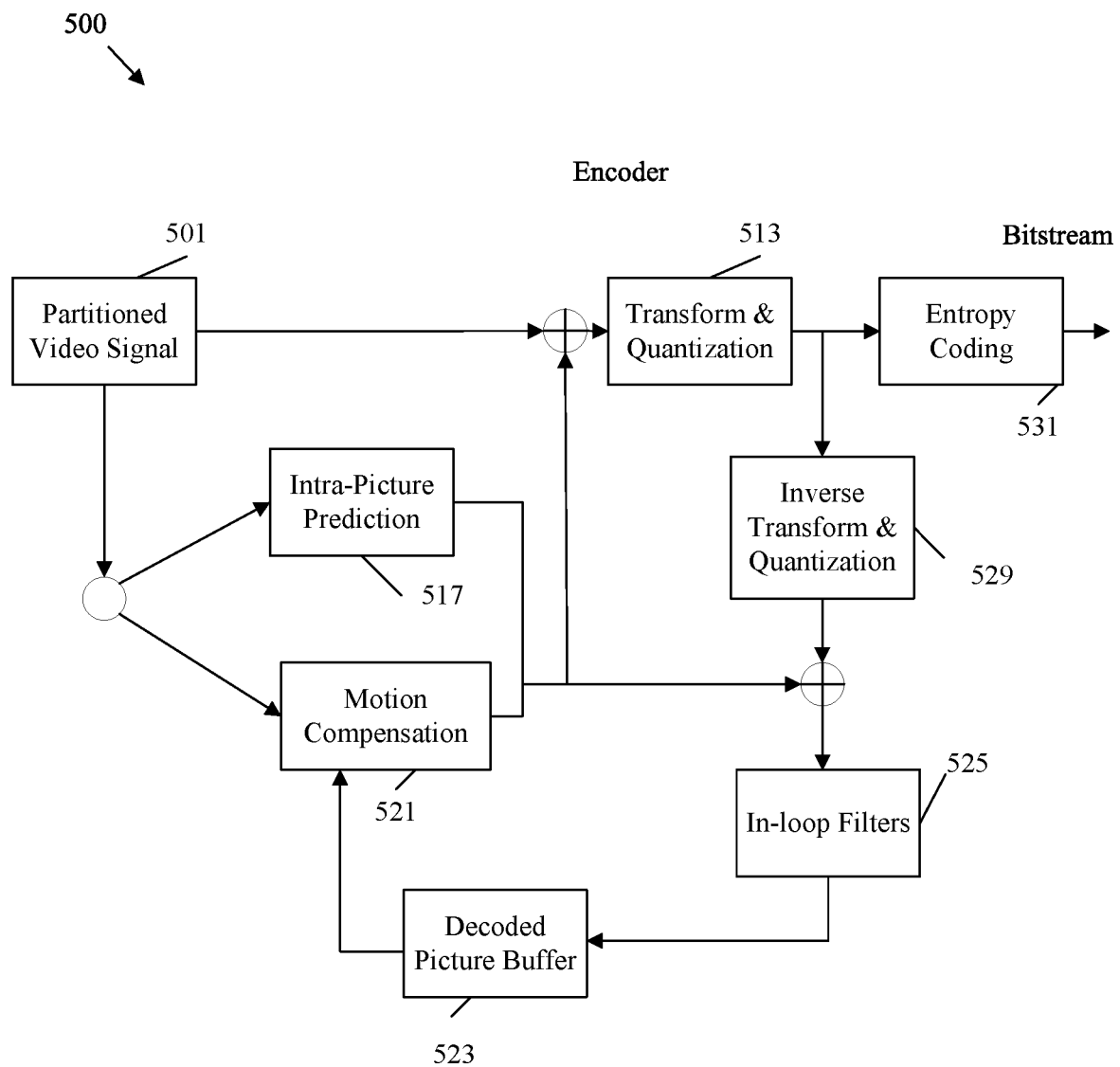
FIG. 5 is a schematic diagram illustrating an example video encoder that may encode sub-picture bitstreams.

FIG. 5 is a block diagram illustrating an example video encoder 500 that may encode sub-picture bitstreams. Video encoder 500 may be employed to implement the encoding functions of codec system 400 and/or implement steps 301, 303, 305, 307, and/or 309 of method 300. Further, encoder 500 may be employed to implement steps 205-209 of method 200 as well as encoder 103. Encoder 500 partitions an input video signal (e.g., a sub-picture video signal), resulting in a partitioned video signal 501, which is substantially similar to the partitioned video signal 401. The partitioned video signal 501 is then compressed and encoded into a bitstream by components of encoder 500.

Specifically, the partitioned video signal 501 is forwarded to an intra-picture prediction component 517 for intra-prediction. The intra-picture prediction component 517 may be substantially similar to intra-picture estimation component 415 and intra-picture prediction component 417. The partitioned video signal 501 is also forwarded to a motion compensation component 521 for inter-prediction based on reference blocks in a decoded picture buffer component 523. The motion compensation component 521 may be substantially similar to motion estimation component 421 and motion compensation component 419. The prediction blocks and residual blocks from the intra-picture prediction component 517 and the motion compensation component 521 are forwarded to a transform and quantization component 513 for transform and quantization of the residual blocks. The transform and quantization component 513 may be substantially similar to the transform scaling and quantization component 413. The transformed and quantized residual blocks and the corresponding prediction blocks (along with associated control data) are forwarded to an entropy coding component 531 for coding into a bitstream. The entropy coding component 531 may be substantially similar to the header formatting and CABAC component 431.

The transformed and quantized residual blocks and/or the corresponding prediction blocks are also forwarded from the transform and quantization component 513 to an inverse transform and quantization component 529 for reconstruction into reference blocks for use by the motion compensation component 521. The inverse transform and quantization component 529 may be substantially similar to the scaling and inverse transform component 429. In-loop filters in an in-loop filters component 525 are also applied to the residual blocks and/or reconstructed reference blocks, depending on the example. The in-loop filters component 525 may be substantially similar to the filter control analysis component 427 and the in-loop filters component 425. The in-loop filters component 525 may include multiple filters as discussed with respect to in-loop filters component 425. The filtered blocks are then stored in a decoded picture buffer component 523 for use as reference blocks by the motion compensation component 521. The decoded picture buffer component 523 may be substantially similar to the decoded picture buffer component 423.

The encoder 500 receives sub-picture video signals split from a spherical video signal for use in conjunction with a VR system using viewport dependent coding. As noted above, when sub-picture video signals are transmitted to a decoder at varying resolutions, artifacts can occur due to data lost in the process of reducing resolutions for the lower quality sub-picture video signals. This is because both intra-prediction and inter-prediction encode blocks based on samples (pixels) from adjacent blocks. When the references cross sub-picture video signal boundaries, the references may become inaccurate due to loss of data in an adjacent sub-picture video signal. In order to mitigate these issues, the motion compensation component 521 and the intra-picture prediction component 517 of encoder 500 encode each sub-picture video signal to be self-contained. Specifically, the motion compensation component 521 and the intra-picture prediction component 517 are configured to only reference full sample locations in the same sub-picture video signal during encoding. Specifically, when a first sub-picture video signal is being encoded, the encoder 500 is prevented from referencing full sample locations from other sub-picture video signals. This applies to both intra-prediction modes and inter-prediction motion vectors.

As noted above, a sample, also known as pixel, is a value at a corresponding location, where value can include a luma/light value and/or one or more chroma/color values. Recording devices take pictures (and displays display) by expressing values at integer positions on a sampling grid. An integer position on a sampling grid is known as a full sample location, because a sample value is expressed at a full sample location. A fractional sample location is a position that is not an integer position on the sampling grid. Fractional sample locations may be employed when objects are displaced by non-integer distances between frames and when performing filtering. A value at a fractional sample location can be determined as a weighted value (e.g., weighted average) determined based on the values at full sample locations. The motion compensation component 521 and the intra-picture prediction component 517 may reference such fractional sample locations in the first sub-picture video signal, but only when the effective sample value at the referenced fractional sample location can be recreated by interpolation based solely on sample locations inside the first sub-picture bitstream (e.g., without reference to any other sub-picture bitstream).

Further, the motion compensation component 521 may generate motion vector candidate lists for a first sub-picture bitstream when performing inter-prediction. However, the motion compensation component 521 may not include motion vectors in the candidate list when the motion vectors are from blocks in another sub-picture bitstream. These restrictions ensure that each sub-picture bitstream can be decoded without reference to a neighbor sub-picture bitstream, and hence resolution based mismatches are avoided.

Further, video coding may employ parallelization, such as WPP, to speed up the video coding process. WPP allows a current block (e.g., CTU) to be coded so long as the block above the current block and the block above and to the right of the current block have already been decoded. WPP creates the impression of a wave, with the top row of blocks being coded two blocks ahead of the second row of blocks, which is two blocks ahead of the third row, etc. Sub-picture bitstream frames can be treated as tiles at the decoder, and the tiles can be merged to reconstruct the spherical video signal. WPP may not be configured to operate when tiles are present, because WPP operates on an entire frame at once (e.g., the frame from the spherical video signal) and not on a tile level. Accordingly, encoder 500 can disable WPP when encoding a sub-picture bitstream. For example, an entropy_coding_sync_enabled_flag is used by WPP. The flag is included in the PPS syntax for each picture. The encoder 500 can set the entropy_coding_sync_enabled_flag to zero to disable WPP for the sub-picture video signals.

Also, the encoder 500 can avoid timing mismatch issues between the sub-picture bitstreams by encoding the sub-picture video signals in tracks and ensuring the tracks have the same presentation time. Further, the encoder 500 can ensure each sample from a common VR picture (e.g., a frame in a spherical video signal) employs the same picture order count value even when such samples are split into different sub-picture bitstreams and/or carried in different tracks.

Figure 6:
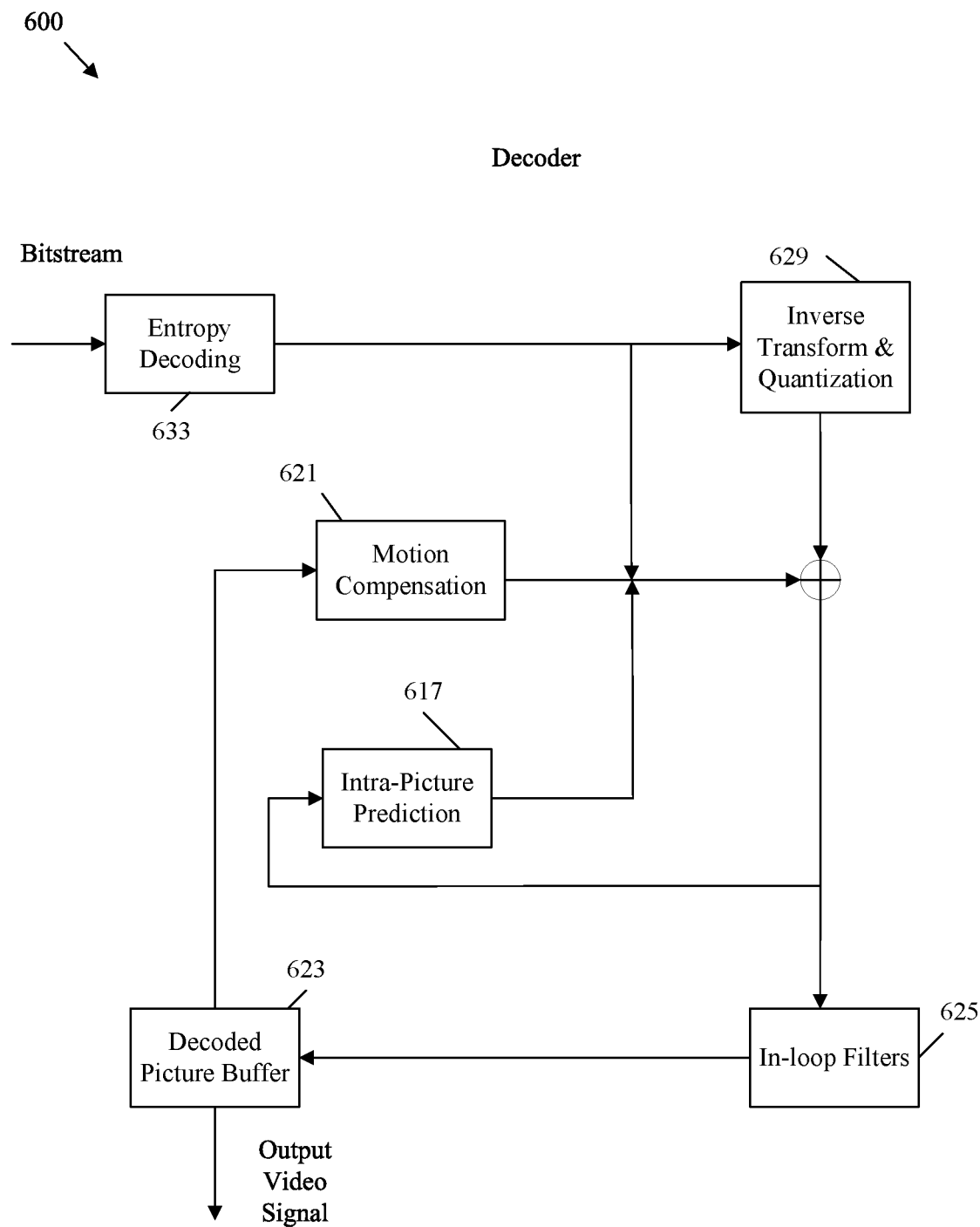
FIG. 6 is a schematic diagram illustrating an example video decoder that may decode sub-picture bitstreams.

FIG. 6 is a block diagram illustrating an example video decoder 600 that may decode sub-picture bitstreams. Video decoder 600 may be employed to implement the decoding functions of codec system 400 and/or implement steps 311, 313, 315, and/or 317 of operating method 300. Further, decoder 600 may be employed to implement steps 211-213 of method 200 as well as decoder 107. Decoder 600 receives a plurality of sub-picture bitstreams, for example from an encoder 500, generates a reconstructed output video signal including sub-picture video signals, merges the sub-picture video signals into a spherical video signal, and forwards the spherical video signal for display to a user via a rendering device.

The bitstreams are received by an entropy decoding component 633. The entropy decoding component 633 is configured to implement an entropy decoding scheme, such as CAVLC, CABAC, SBAC, PIPE coding, or other entropy coding techniques. For example, the entropy decoding component 633 may employ header information to provide a context to interpret additional data encoded as codewords in the bitstreams. The decoded information includes any desired information to decode the video signal, such as general control data, filter control data, partition information, motion data, prediction data, and quantized transform coefficients from residual blocks. The quantized transform coefficients are forwarded to an inverse transform and quantization component 629 for reconstruction into residual blocks. The inverse transform and quantization component 629 may be similar to inverse transform and quantization component 529.

The reconstructed residual blocks and/or prediction blocks are forwarded to intra-picture prediction component 617 for reconstruction into image blocks based on intra-prediction operations. The intra-picture prediction component 617 may be similar to intra-picture estimation component 415 and an intra-picture prediction component 417. Specifically, the intra-picture prediction component 617 employs prediction modes to locate a reference block in the frame and applies a residual block to the result to reconstruct intra-predicted image blocks. The reconstructed intra-predicted image blocks and/or the residual blocks and corresponding inter-prediction data are forwarded to a decoded picture buffer component 623 via an in-loop filters component 625, which may be substantially similar to decoded picture buffer component 423 and in-loop filters component 425, respectively. The in-loop filters component 625 filters the reconstructed image blocks, residual blocks, and/or prediction blocks, and such information is stored in the decoded picture buffer component 623. Reconstructed image blocks from decoded picture buffer component 623 are forwarded to a motion compensation component 621 for inter-prediction. The motion compensation component 621 may be substantially similar to motion estimation component 421 and/or motion compensation component 419. Specifically, the motion compensation component 621 employs motion vectors from a reference block to generate a prediction block and applies a residual block to the result to reconstruct an image block. The resulting reconstructed blocks may also be forwarded via the in-loop filters component 625 to the decoded picture buffer component 623. The decoded picture buffer component 623 continues to store additional reconstructed image blocks, which can be reconstructed into frames via the partition information. Such frames may also be placed in a sequence. The sequence is output toward a display as a reconstructed output video signal.

As noted above, the decoder 600 decodes the sub-picture bitstreams to create sub-picture video signals. The decoder 600 can then employ a lightweight merge algorithm to merge the sub-picture video signals into a spherical video signal for display. The lightweight merge algorithm includes selecting sub-pictures from each sub-picture video signal that occur at a common presentation time, and are hence part of the same spherical frame. The sub-pictures are then merged by positioning each sub-picture based on a position associated with the corresponding sub-picture video signal. The merge algorithm is considered a lightweight algorithm as the approach may not require the decoder 600 to consider dependencies between sub-picture video signals. Instead, each sub-picture video signal can be decoded relatively independently, and the results can be merged (e.g., with some filtering at sub-picture boundaries). This lightweight merging algorithm employs reduced processing resources when compared to considering sub-picture bitstream dependencies during decoding. Further, the lightweight merging algorithm can be performed in real-time during display to a user instead of performing such merging in pre-processing prior to display. Hence, the lightweight merging algorithm may make viewport dependent coding possible, as viewport dependent coding is performed in real-time during display to a user. Further, the lightweight merging algorithm can be performed without artifacts due to the encoding constraints employed at the encoder 500 as discussed above. Specifically, the lightweight merging algorithm can be performed as each sub-picture bitstream is encoded in a manner that is self-contained and not dependent on other sub-picture bitstreams.

Figure 7:
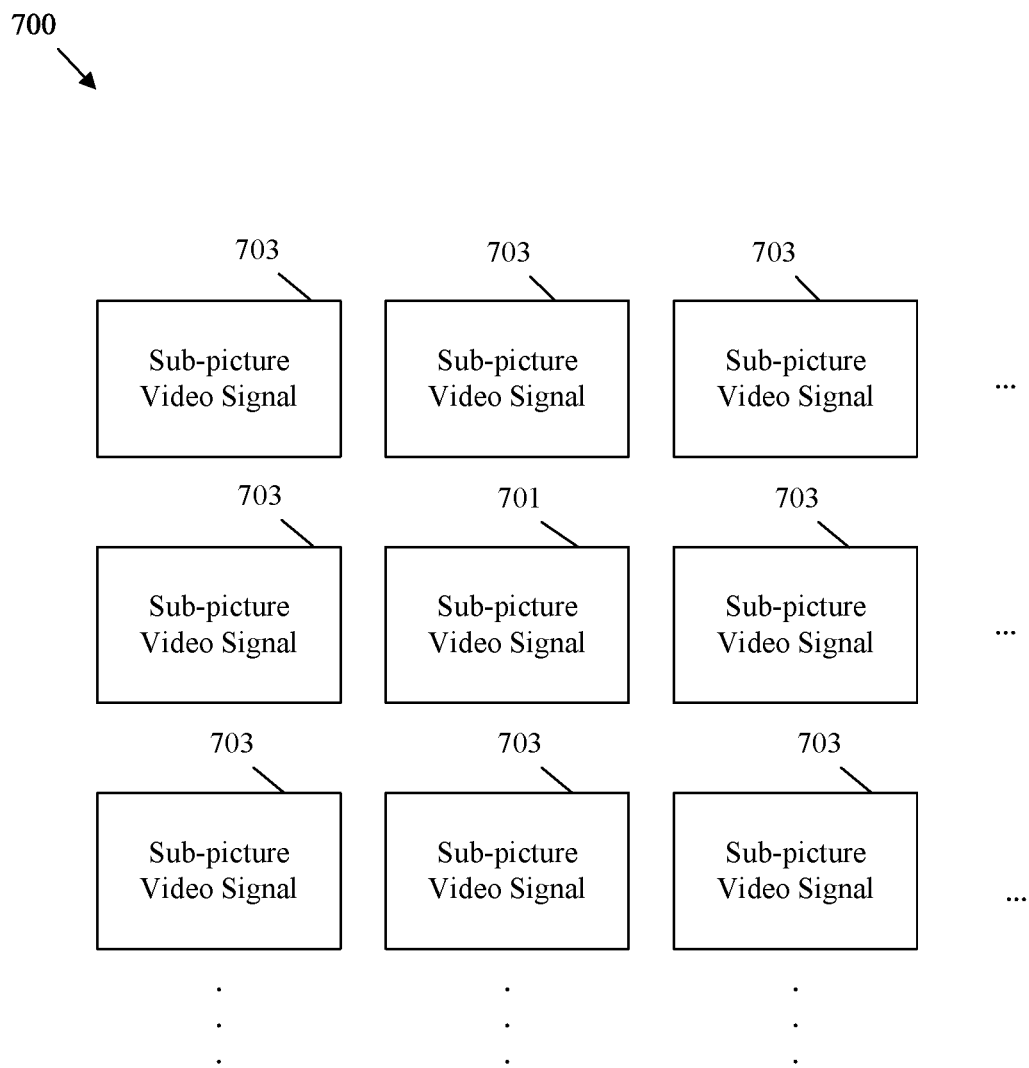
FIG. 7 is a schematic diagram illustrating a plurality of sub-picture video signals split from a VR picture video stream.

The preceding FIGS. describe various components and methods of encoding and decoding sub-picture video signals for use in VR systems. FIG. 7 is presented to illustrate example spatial positioning of sub-picture frames mapped from a spherical frame. Then FIGS. 8-11 describe mechanisms employed in inter-prediction, such as motion vector usage and candidate list generation. These FIGS. are presented to illustrate the problems that can occur when motion vectors cross sub-picture video signal boundaries, as illustrated by FIG. 7, as well as to illustrate constraints that can be applied to mitigate such problems.

FIG. 7 is a schematic diagram illustrating a plurality of sub-picture video signals 701 and 703 split from a VR picture video stream 700. The VR picture video stream 700 can be mapped to the sub-picture video signals 701 and 703 by an encoder 103 and/or VR coding device 104. The sub-picture video signals 701 and 703 can be merged back into the VR picture video stream 700 by a decoder 107. Hence, the VR picture video stream 700 and the sub-picture video signals 701 and 703 illustrate step 205 and step 213 of method 200. The sub-picture video signals 701 and 703 can be encoded and decoded by inter-prediction, for example by motion estimation component 421, motion compensation component 419, motion compensation component 521, and/or motion compensation component 621. The sub-picture video signals 701 and 703 can also be encoded and decoded by intra-prediction, for example by intra-picture estimation component 415, intra-picture prediction component 417, intra-picture prediction component 517, and/or intra-picture prediction component 617. Hence, the sub-picture video signals 701 and 703 can each be encoded and decoded according to method 300.

A VR picture video stream 700 includes a plurality of frames presented over time. The frames of the VR picture video stream 700 can each be sub-divided into sub-frames, also known as sub-pictures. Accordingly, each frame and corresponding sub-picture includes a temporal position (e.g., picture order) as part of the temporal presentation. Sub-picture video signals 701 and 703 are created when the sub-division is applied consistently over time. Such consistent sub-division creates sub-picture video signals 701 and 703 where each stream contains a set of sub-pictures of a predetermined size, shape, and spatial position relative to corresponding frames in the VR picture video stream 700. Further, the set of sub-pictures in a sub-picture video signal 701 and/or 703 varies in temporal position over the presentation time. As such, the sub-pictures of the sub-picture video signals 701 and 703 can be aligned in the time domain based on temporal position. Then the sub-pictures from the sub-picture video signals 701 and 703 at each temporal position can be merged in the spatial domain based on predefined spatial position to reconstruct the VR picture video stream 700 for display.

As used herein sub-picture video signals 701 may be referred to as a first sub-picture video signal (and/or first sub-picture bitstream if in an encoded context). Sub-picture video signals 703 are presented to illustrate neighbor sub-picture video signal (and/or neighbor sub-picture bitstreams) that are adjacent to the first sub-picture video signal 701. Hence, sub-picture video signals 701 and 703 are distinguished for purposes of discussing the various embodiments disclosed herein, and are otherwise substantially similar.

Figure 8:
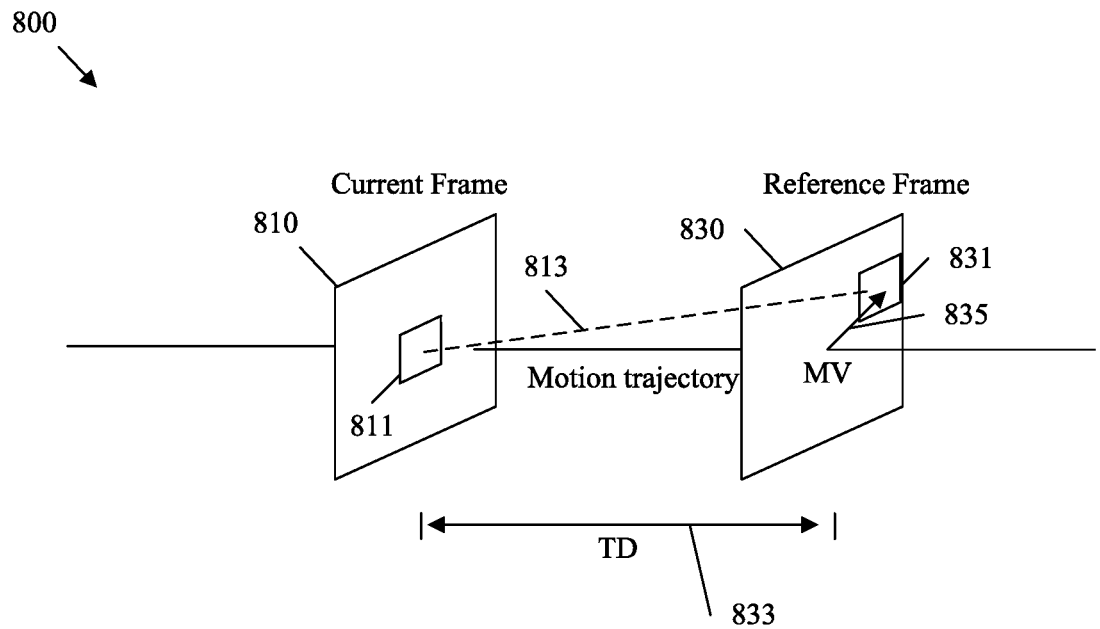
FIG. 8 is a schematic diagram illustrating an example of unidirectional inter-prediction.

FIG. 8 is a schematic diagram illustrating an example of unidirectional inter-prediction 800, for example as performed to determine motion vectors (MVs) at block compression step 305, block decoding step 313, motion estimation component 421, motion compensation component 419, motion compensation component 521, and/or motion compensation component 621. For example, unidirectional inter-prediction 800 can be employed to determine motion vectors for blocks from a sub-picture in a sub-picture video signal 701 and/or 703, and hence can be employed by an encoder 103 and a decoder 107 when performing step 207 and 211, respectively, of method 200.

Unidirectional inter-prediction 800 employs a reference frame 830 with a reference block 831 to predict a current block 811 in a current frame 810. The reference frame 830 may be temporally positioned after the current frame 810 as shown (e.g., as a subsequent reference frame), but may also be temporally positioned before the current frame 810 (e.g., as a preceding reference frame) in some examples. The current frame 810 is an example frame/picture being encoded/decoded at a particular time. The current frame 810 contains an object in the current block 811 that matches an object in the reference block 831 of the reference frame 830. The reference frame 830 is a frame that is employed as a reference for encoding a current frame 810, and a reference block 831 is a block in the reference frame 830 that contains an object also contained in the current block 811 of the current frame 810.

The current block 811 is any coding unit that is being encoded/decoded at a specified point in the coding process. The current block 811 may be an entire partitioned block, or may be a sub-block in the affine inter-prediction case. The current frame 810 is separated from the reference frame 830 by some temporal distance (TD) 833. The TD 833 indicates an amount of time between the current frame 810 and the reference frame 830 in a video sequence, and may be measured in units of frames. The prediction information for the current block 811 may reference the reference frame 830 and/or reference block 831 by a reference index indicating the direction and temporal distance between the frames. Over the time period represented by the TD 833, the object in the current block 811 moves from a position in the current frame 810 to another position in the reference frame 830 (e.g., the position of the reference block 831). For example, the object may move along a motion trajectory 813, which is a direction of movement of an object over time. A motion vector 835 describes the direction and magnitude of the movement of the object along the motion trajectory 813 over the TD 833. Accordingly, an encoded motion vector 835 and a reference block 831 provides information sufficient to reconstruct a current block 811 and position the current block 811 in the current frame 810.

Figure 9:
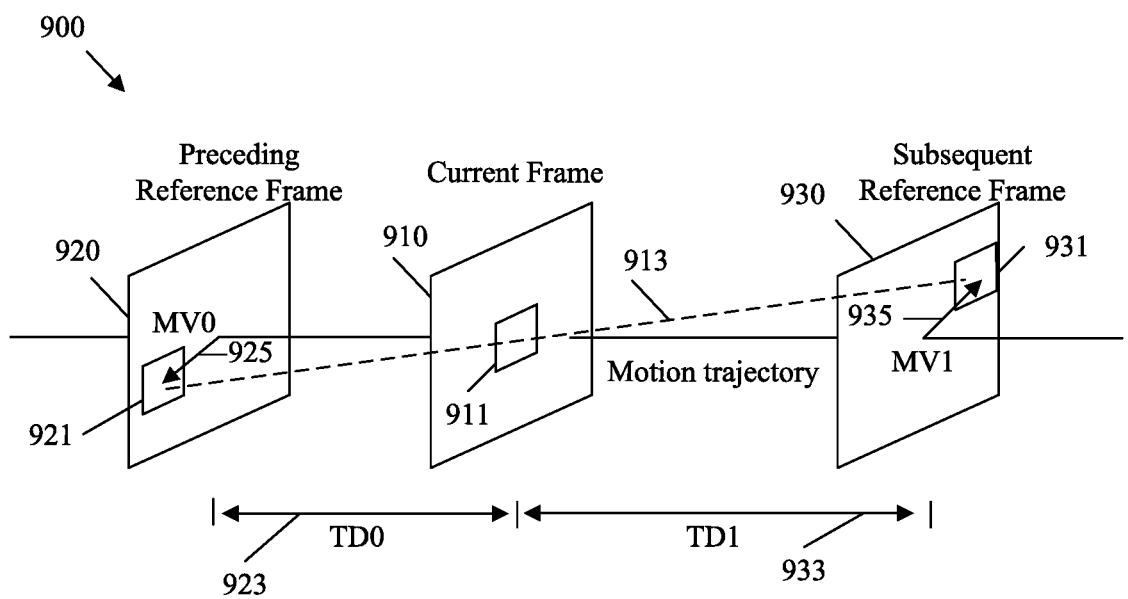
FIG. 9 is a schematic diagram illustrating an example of bidirectional inter-prediction.

FIG. 9 is a schematic diagram illustrating an example of bidirectional inter-prediction 900, for example as performed to determine motion vectors (MVs) at block compression step 305, block decoding step 313, motion estimation component 421, motion compensation component 419, motion compensation component 521, and/or motion compensation component 621. For example, unidirectional inter-prediction 800 can be employed to determine motion vectors for blocks from a sub-picture in a sub-picture video signal 701 and/or 703, and hence can be employed by an encoder 103 and a decoder 107 when performing step 207 and 211, respectively, of method 200. It should be noted that an encoder can select to encode a block according to bidirectional inter-prediction 900 or unidirectional inter-prediction 800 (e.g., as part of RDO) based on which approach provides the best coding efficiency and/or reconstruction quality for the specified block.

Bidirectional inter-prediction 900 is similar to unidirectional inter-prediction 800, but employs a pair of reference frames to predict a current block 911 in a current frame 910. Hence current frame 910 and current block 911 are substantially similar to current frame 810 and current block 811, respectively. The current frame 910 is temporally positioned between a preceding reference frame 920, which occurs before the current frame 910 in the video sequence, and a subsequent reference frame 930, which occurs after the current frame 910 in the video sequence. Preceding reference frame 920 and subsequent reference frame 930 are otherwise substantially similar to reference frame 830.

The current block 911 is matched to a preceding reference block 921 in the preceding reference frame 920 and to a subsequent reference block 931 in the subsequent reference frame 930. Such a match indicates that, over the course of the video sequence, an object moves from a position at the preceding reference block 921 to a position at the subsequent reference block 931 along a motion trajectory 913 and via the current block 911. The current frame 910 is separated from the preceding reference frame 920 by some preceding temporal distance (TD0) 923 and separated from the subsequent reference frame 930 by some subsequent temporal distance (TD1) 933. The TD0 923 indicates an amount of time between the preceding reference frame 920 and the current frame 910 in the video sequence in units of frames. The TD1 933 indicates an amount of time between the current frame 910 and the subsequent reference frame 930 in the video sequence in units of frame. Hence, the object moves from the preceding reference block 921 to the current block 911 along the motion trajectory 913 over a time period indicated by TD0 923. The object also moves from the current block 911 to the subsequent reference block 931 along the motion trajectory 913 over a time period indicated by TD1 933. The prediction information for the current block 911 may reference the preceding reference frame 920 and/or preceding reference block 921 and the subsequent reference frame 930 and/or subsequent reference block 931 by a pair of reference indices indicating the direction and temporal distance between the frames.

A preceding motion vector (MV0) 925 describes the direction and magnitude of the movement of the object along the motion trajectory 913 over the TD0 923 (e.g., between the preceding reference frame 920 and the current frame 910). A subsequent motion vector (MV1) 935 describes the direction and magnitude of the movement of the object along the motion trajectory 913 over the TD1 933 (e.g., between the current frame 910 and the subsequent reference frame 930). As such, in bidirectional inter-prediction 900, the current block 911 can be coded and reconstructed by employing the preceding reference block 921 and/or the subsequent reference block 931, MV0 925, and MV1 935.

As noted above, a block in a sub-picture from a sub-picture video signal 701 and/or 703 can be encoded according to unidirectional inter-prediction 800 and/or bidirectional inter-prediction 900. For example, an object may move over time between a sub-picture video signal 701 and an adjacent sub-picture video signal 703. In such a case, inter-prediction may match samples (e.g., pixels) in a current block in sub-picture video signal 701 with samples in a reference block in the adjacent sub-picture video signal 703. The current block could then be encoded as a motion vector that references the samples in the adjacent sub-picture video signal 703. This approach functions properly so long as both the sub-picture video signal 701 and the sub-picture video signal 703 are decoded at the same resolution. However, in viewport dependent coding, the resolution of sub-picture video signal 703 may be reduced with a lossy process that removes data to further compress the sub-pictures in sub-picture video signal 703. Accordingly, the reference block containing the reference samples may be altered or even removed from the sub-picture in sub-picture video signal 703. In this case, the encoded motion vector may still point to the correct reference block, but the samples contained in the reference block may no longer be accurate for the resolution used by the sub-picture video signal 701. Further, sub-picture video signal 703 may even be completely omitted in some cases, which would result in the motion vector referencing empty data. In any of the above cases, the current block being decoded from the sub-picture video signal 701 is replaced by the lower quality sample, when available, or even expressed in an undefined erroneous manner that depends on the implementation of the decoder. It should be noted that while the present issue is discussed in terms of inter-prediction, the same error could occur in intra-prediction. The only difference is the reference sample in the intra-prediction case occurs at the same temporal position as the current block while the reference sample occurs at a different temporal position than the current block in the inter-prediction case.

In order to avoid these issues, the encoders disclosed herein can be constrained when encoding each sub-picture video signal (e.g., including sub-picture video signal 701 and 703). For example, blocks in a first sub-picture video signal 701 may only be encoded by reference, via motion vector or intra-prediction mode, to full sample locations in the same first sub-picture video signal 701, and hence cannot reference sample locations from other (e.g., adjacent) sub-picture video signals 703. Further, blocks in a first sub-picture video signal 701 can be encoded to reference fractional sample/pixel locations in a sub-picture video signal 701, but only if the sample at the fractional sample location can be recreated by interpolation based solely on sample locations inside the same first sub-picture video signal 701 (e.g., and not in any way reliant on data from the adjacent sub-picture video signals 703). In this manner, samples can be encoded and decoded independently for each sub-picture video signal 701/703 and changes in resolution in an adjacent sub-picture video signal 703 do not affect the first sub-picture video signal 701, and vice versa.

Figure 10:
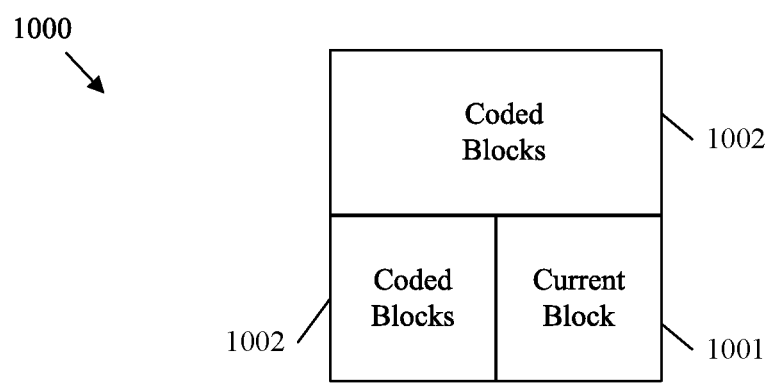
FIG. 10 is a schematic diagram illustrating an example of a block based video coding mechanism.

FIG. 10 is a schematic diagram illustrating an example of a block based video coding mechanism 1000. For example, mechanism 1000 can be used in intra-prediction, unidirectional inter-prediction 800, and/or bidirectional inter-prediction 900. Hence, block based video coding mechanism 1000 can be used to determine intra-prediction modes or motion vectors, depending on the example, at block compression step 305, block decoding step 313, intra-picture estimation component 415, intra-picture prediction component 417, motion estimation component 421, motion compensation component 419, intra-picture prediction component 517, motion compensation component 521, intra-picture prediction component 617, and/or by motion compensation component 621. For example, mechanism 1000 can be employed when encoding blocks from a sub-picture in a sub-picture video signal 701 and/or 703, and hence can be employed by an encoder 103 and a decoder 107 when performing step 207 and 211, respectively, of method 200.

Mechanism 1000 encodes a current block 1001 based on previously coded blocks 1002 in the same frame. In an intra-prediction case, the current block 1001 is matched to samples from the coded blocks 1002. The current block 1001 can then be encoded by an intra-prediction mode that indicates the samples from the coded blocks 1002 that predict the samples in the current block 1001. In the event that a current block 1001 is positioned in a first sub-picture video signal 701 and a coded block 1002 is positioned in an adjacent sub-picture video signal 703, coding errors may occur in viewport dependent coding due to resolution differences. Hence, encoders described herein may be restricted from using intra-prediction modes from a first sub-picture video signal 701 that rely on samples from an adjacent sub-picture video signal 703.

Mechanism 1000 can also be used in certain types of inter-prediction. Specifically, inter-prediction may employ various modes such as merge mode and AMVP mode. In both modes, the motion vector for a current block 1001 can be selected based on motion vectors from the coded blocks 1002. In merge mode, the motion vectors selected from the coded blocks 1002 can be included in a candidate list. The candidate list may also include motion vectors indicating no movement, motion vectors from temporally adjacent blocks in preceding and/or subsequent frames, motion vectors that have been used repeatedly for previously coded blocks, etc. The motion vector for the current block 1001 is then selected from the candidate list. The motion vector for the current block 1001 can then be signaled as a candidate list index. This allows a current block 1001 to be encoded by a single index value. The decoder can generate the candidate list for the current block 1001 by using the same process as the encoder, and can then determine the motion vector for the current block 1001 based on the candidate list index. AMVP mode is similar to merge mode, but can be employed when none of the motion vectors in the candidate list represent the correct motion vector for the current block 1001. In this case, AMVP mode can select the motion vector from the candidate list that most closely matches the correct motion vector for the current block 1001. AMVP mode then encodes both the candidate list index of the selected motion vector candidate as well as a value indicating the difference between the selected motion vector candidate and the correct motion vector for the current block.

Both merge mode and AMVP mode can cause errors in viewport dependent coding when the current block 1001 is positioned in a first sub-picture video signal 701 and the coded block 1002 is positioned in an adjacent sub-picture video signal 703. For example, when the resolution of the adjacent sub-picture video signal 703 is reduced, the motion vector for the coded block 1002 in the adjacent sub-picture video signal 703 may change. This would result in the candidate list generated for the current block 1001 at the decoder referencing motion vectors that have been altered due to resolution changes. However, the candidate list generated by the encoder is generated when both the current block 1001 and the coded block 1002 share the same resolution. Hence, the candidate lists no longer match in this case. When the candidate lists do not match, the index can point to the wrong motion vector candidate at the decoder. This can result in the decoder selecting the wrong reference block for the current block 1001, and hence displaying the wrong sample values for the current block 1001.

In order to overcome these issues, the encoders disclosed herein may be restricted so that motion vectors candidate lists for a current block 1001 in a first sub-picture video signal 701 do not include motion vectors from coded blocks 1002 in neighbor sub-picture bitstreams 703. For example, during candidate list generation such motion vectors from other neighbor sub-picture bitstreams 703 are not added to the candidate list, and hence cannot be selected by AMVP mode or merge mode when performing inter-prediction.

This restriction, in conjunction to the restriction preventing referencing samples in other sub-picture bitstreams 703, ensures that each sub-picture bitstream 701 can be decoded without reference to a neighbor sub-picture bitstream 703, and hence resolution based mismatches are avoided.

Figure 11:
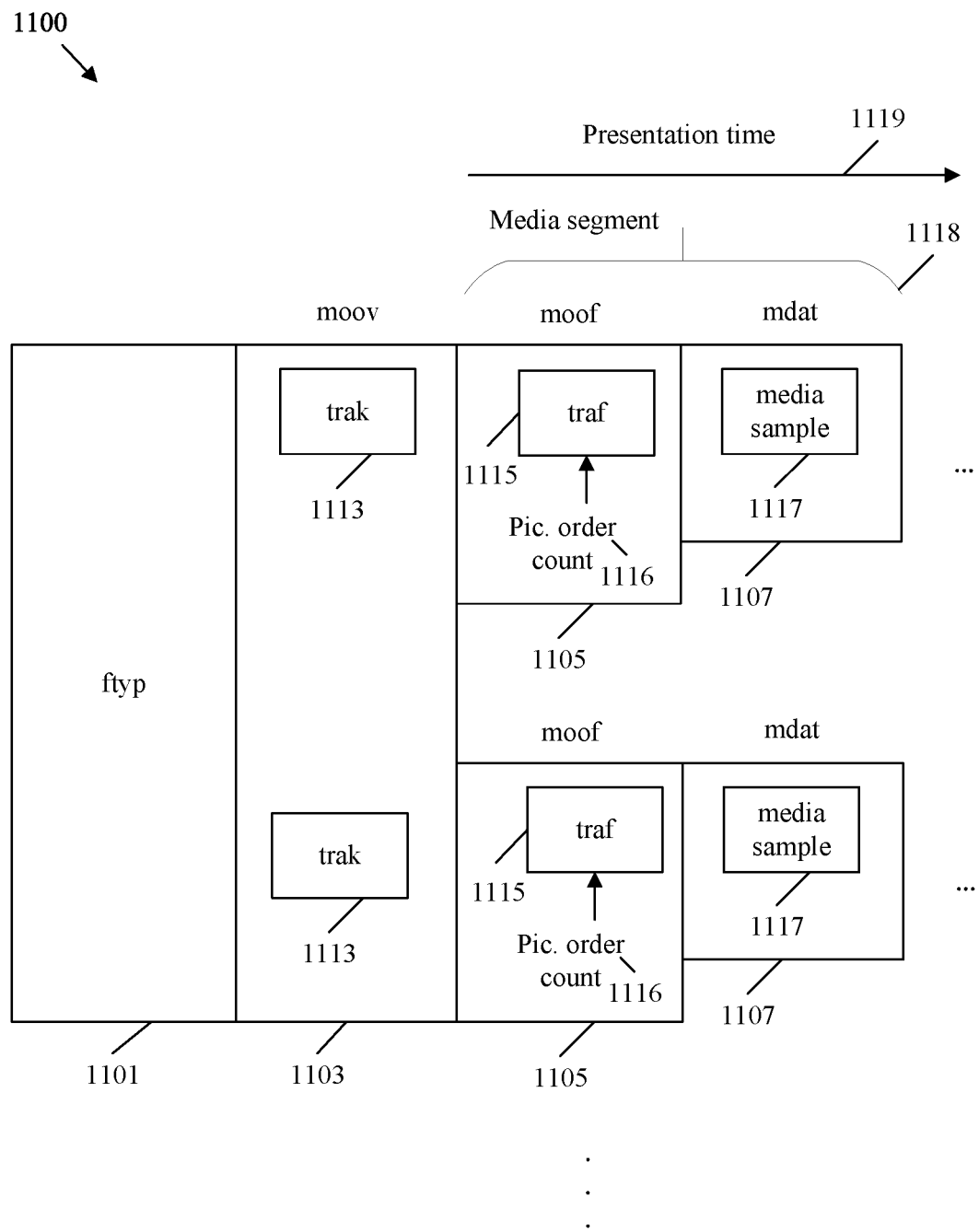
FIG. 11 is a schematic diagram illustrating an example International Standard Organization (ISO) base media file format (ISOBMFF) for transporting a video coding.

FIG. 11 is a schematic diagram illustrating an example ISOBMFF 1100 for transporting a video coding. For example, a video coding generated by encoder 103, codec system 400, and/or encoder 500 can be stored in ISOBMFF 1100 for decoding by a decoder 107, codec system 400, and/or decoder 600. Hence, ISOBMFF 1100 can be employed to store and transmit data in method 200 and 300. Further, the results of unidirectional inter-prediction 800, and/or bidirectional inter-prediction 900, and mechanism 1000, as applied to a sub-picture in a sub-picture video signal 701 and/or 703, can be stored in ISOBMFF 1100.

ISOBMFF 1100 includes a series of boxes that can include other boxes. A box is an object-oriented building block defined by a unique type identifier and length. A box is the elementary syntax structure in ISOBMFF 1100 and may include a four-character coded box type, a byte count of the box, and a payload. For example, a box may be a syntax structure comprising a coded box type, a byte count of the box, and a payload. In some instances, all data in a file conforming to High Efficiency Video Coding (HEVC) file format may be contained within boxes and there may be no data in the file that is not in a box. Thus, an ISOBMFF file may include a sequence of boxes, and boxes may contain other boxes. For instance, the payload of a box may include one or more additional boxes.

Data from an encoded bitstream, including both syntax and coded media samples, can be stored in predetermined boxes in ISOBMFF 1100. This allows the decoder to find the relevant data by opening the corresponding box. At the top level, ISOBMFF 1100 includes a file type (ftyp) box 1101, a movie (moov) box 1103, movie fragment (moof) boxes 1105, and media data (mdat) boxes 1107. The moov box 1103 contain a plurality of track (trak) boxes 1113. The moof boxes 1105 contain one or more track fragment (traf) boxes 1115. The mdat boxes 1107 contain one or more media samples 1117. The preceding boxes may include additional sub-boxes. It should be noted that ISOBMFF 1100 contains a large number of usable boxes. Accordingly, the boxes shown in FIG. 11 are exemplary, and are included to illustrate certain examples. The examples disclosed herein may also employ other ISOBMFF 1100 boxes and/or configurations.

The ftyp box 1101 contains file compatibility information for the encoding. In general, the ftyp box 1101, and any sub-boxes, contain data indicating decoding devices capable of displaying the included video data.

The moov box 1103 contains functional data relative to the encoding. For example, the moov box 1103 may contain digital rights management (DRM) data for the file. The moov box 1103 may also contain overall data indicating how the video should be rendered. For example, the moov box 1103 contains a plurality of trak boxes 1113. Each trak box 1113 contains data describing a corresponding track. For example, tracks can include sub-titles, audio tracks, as well various representations of the video. For example, video encoded in a plurality of resolutions can include a trak box 1113 for each resolution. Accordingly, a trak box 1113 can contain data indicating to a decoder how the corresponding track should be played and/or displayed. Further, an encoder and/or associated storage device may only transmit relevant tracks to a decoder. For example, a decoder can request some tracks and not others, which allows the decoder to receive only a particular resolution. This allows the decoder to determine and obtain an appropriate resolution depending on the capabilities of the client equipment and/or network, for example based on the user rendering device capabilities, available network bandwidth, etc. In the VR context, different sub-picture bitstreams can be stored in different tracks. In such a case, the moov box 1103 may contain a trak box 1113 for each sub-picture bitstream at each representation (e.g., resolution).

Each track can be split into a plurality of media segments 1118, also called track fragments. A media segment 1118 is sequence of media of a predetermined duration, such as a three second video clip. Encoding the track as a series of media segments 1118 allows a decoder to obtain data from different representations, for example based on user input and/or based on changing network demands. In VR based viewport dependent coding, the media segments 1118 allow the decoder to obtain different spatial portions of a VR video at different resolutions based on the direction a user turns a viewport of a VR rendering device. Information describing the media segments 1118 are stored in the moof box 1105 and the corresponding traf box 1115. For example, the moof box 1105 may contain data indicating the start and end point of a media segment 1118 as well as the location of the media segment 1118 in memory. The traf box 1115 may contain timing data related to the media segment 1118. For example, the traf box 1115 may contain a picture order count 1116 for each frame in the media segments 1118. The picture order count 1116 indicates the order of the frame in the media segment 1118, and hence can be used by the decoder to position the frames in the media segments 1118 into the proper sequence for display. The traf box 1115 can also contain media presentation time data 1119. The media presentation time data 1119 indicates the length of time over which the media segment 1118 should be displayed, for example based on picture order count 1116, frame rate, etc.

The mdat box 1107 is a container for the media samples 1117 referenced by the traf boxes 1115. Hence, the media samples 1117 are organized into track fragments based on timing, type (e.g., audio, sub-title, video, etc.), representation (e.g., resolution), and in the case of viewport dependent coding spatial position. As such, the media samples 1117 include the sub-picture bitstreams encoded from the sub-picture video signals 701 and 703 at various resolutions. These media samples 1117 can be forwarded to a decoder for rendering and display based on user device (e.g., decoder) request.

Another source of potential error in viewport dependent coding is the presentation time data 1119 and/or the picture order count 1116 may change between resolution. As this data is specific to a sub-picture video signal, such resolution related changes could cause spatial sections of the VR video to be displayed out of order. For example, different sub-picture portions of the spherical video frame could be shown at different rates, which would cause the user to view portions of the VR video out of order with other portions of the VR video in the same VR frame.

In order to mitigate such timing mismatch issues, the encoders herein may be constrained to ensure each track, as included in the media samples 1117 and described by traf box 1115 and trak box 1113, have the same presentation time 1119 regardless of resolution. Further, the media samples 1117 for each track are constrained to include the same number of media samples 1117 (e.g., the same number of total frames). Further, the media samples 1117 for each track segment that are associated with the same VR frame may use the same picture order count 1116 value. This may be maintained even when such sub-pictures are split into different sub-picture bitstreams and/or carried in different tracks. When these constraints are enforced, the sub-pictures are displayed at the same order and rate regardless of resolution. Hence, different resolutions can be mixed into a single spherical video signal without producing timing errors.

In addition, as discussed above, WPP can alter the way blocks are decoded by altering decoding order. This may cause errors when applied to multiple sub-pictures combined from multiple tracks into a single frame of a VR based spherical video signal. The encoders disclosed herein may disable WPP by altering data in a PPS for each sub-picture. For example, an entropy_coding_sync_enabled_flag in each PPS may be set to zero to disable WPP for the sub-picture video signals. In some examples, PPS data is stored in-band by including the PPS in the media samples 1117. In other examples, PPS data may be stored in the moof 1105, the traf box 1115, etc.

Figure 12:
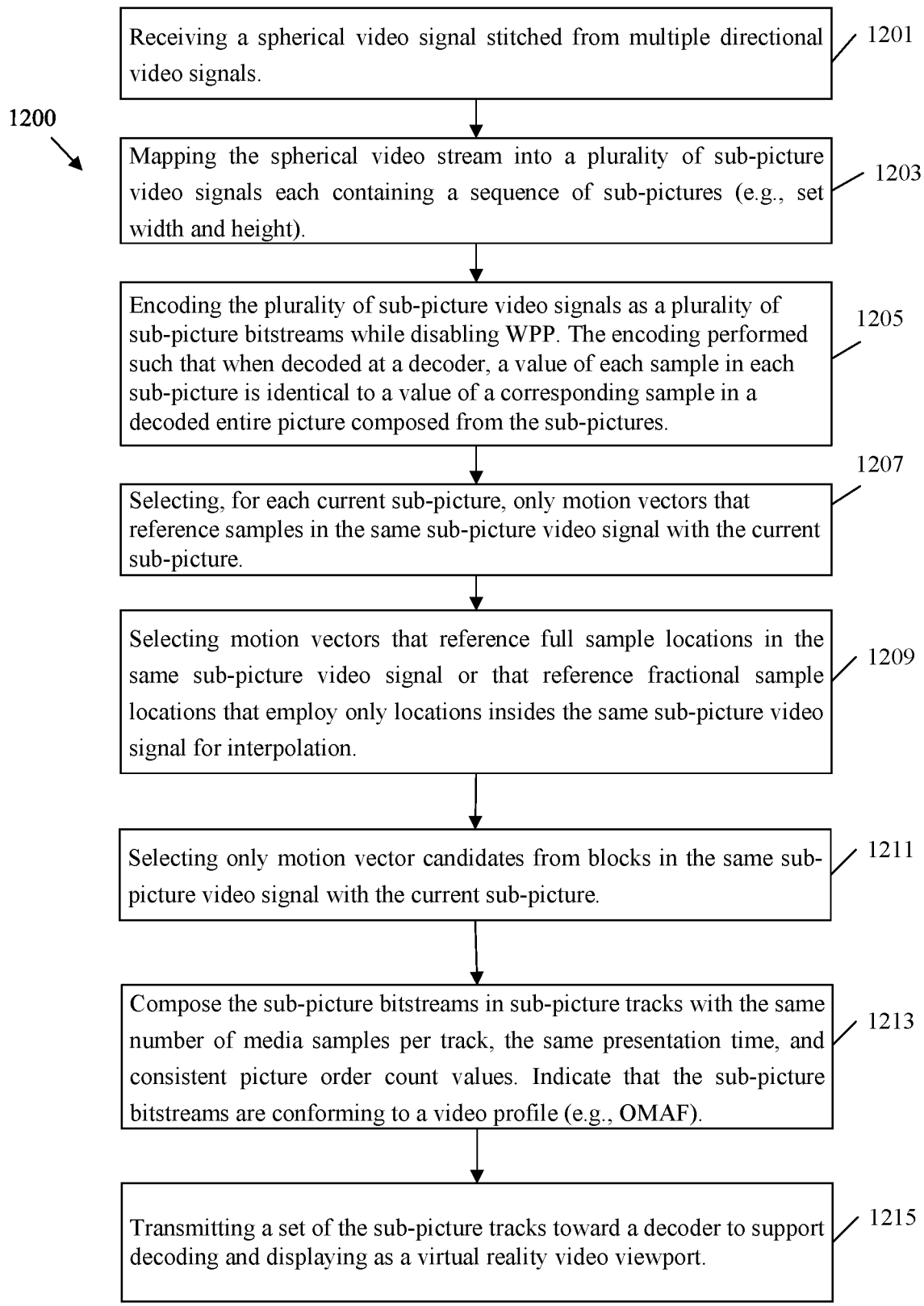
FIG. 12 is a flowchart of an example method of encoding sub-picture bitstreams.

FIG. 12 is a flowchart of an example method 1200 of encoding sub-picture video signals, such as sub-picture video signals 701 and 703 split from a spherical video signal for use as VR video displayed over a viewport. Method 1200 may encode such sub-picture video signals in ISOBMFF 1100. Method 1200 can be employed by an encoder, such as encoder 103, codec system 400, and/or encoder 500, to encode the sub-picture video signals via viewport dependent coding at a decoder, such as decoder 107, codec system 400, and/or decoder 600. Further, method 1200 can be employed to implement viewport dependent coding in order to support methods 200 and 300. Further, method 1200 may employ unidirectional inter-prediction 800, bidirectional inter-prediction 900, and/or mechanism 1000 in viewport dependent coding without creating visual artifacts due to sub-picture video signal boundaries.

At step 1201, a spherical video signal is received. The spherical video signal can be stitched together from multiple directional video streams taken from an array of cameras, such as multi-directional camera 101.

At step 1203, the spherical video signal is mapped into a plurality of sub-picture video signals, such as sub-picture video signals 701 and 703. Each of the sub-picture video signals contains a sequence of sub-pictures of the spherical video signal. For example, each sub-picture video signal may contain a specified spatial portion of each frame of the spherical video signal, and hence may contain a constant spatial portion of the spherical video signal over the length of the video stream (e.g., over the time domain). It should be noted that mapping the spherical video signal into the plurality of sub-picture video signals may include setting a width and height for each sub-picture video signal in the spatial domain. In some examples, setting the width is constrained such that the width is an integer multiple of sixty four pixels and the width is greater than or equal to two hundred fifty six pixels. Further, in some examples setting the height is constrained such that the height is an integer multiple of sixty four pixels and the height is greater than or equal to two hundred fifty six pixels.

At steps 1205-1213, the plurality of sub-picture video signals are encoded as a plurality of sub-picture bitstreams according to several constraints. At step 1205, the plurality of sub-picture video signals can be encoded as a plurality of sub-picture bitstreams. Such encoding may be performed such that, when decoded at a decoder, a value of each sample in each sub-picture is identical to a value of a corresponding sample in a decoded entire picture composed from the sub-pictures. Such encoding can be accomplished, for example by employing steps 1207-1213. Further, WPP may optionally be disabled as part of the encoding process. An example mechanism for disabling WPP includes setting an entropy_coding_sync_enabled_flag to zero. The entropy_coding_sync_enabled_flag is included in a PPS for the spherical video signal and/or in a PPS for the sub-picture bitstreams.

At step 1207, the plurality of sub-picture video signals are encoded, at least in part, via inter-prediction. During inter-prediction for each current sub-picture of each sub-picture video signal, motion vectors are selected. However, such selection is constrained to include selecting only motion vectors that reference samples in a common/the same sub-picture video signal with the current sub-picture. Hence, selected motion vectors do not reference samples in sub-pictures that are not included in the same sub-picture video signal as the current sub-picture.

At step 1209, the selection of motion vectors that reference samples in a common/the same sub-picture video signal with the current sub-picture is further constrained to include selecting motion vectors that reference full sample locations in the common sub-picture video signal. Motion vectors can be selected that reference fractional sample locations in the common sub-picture video signal with the current sub-picture. However, such selections are constrained to only select fractional sample locations that can be reconstructed by interpolation by employing only full sample locations insides the common sub-picture video signal.

At step 1211, encoding of the plurality of sub-picture video signals via inter-prediction is further constrained. Specifically, motion vectors can be selected for each current frame sub-picture that employs inter-prediction. However, when motion vector candidate lists are employed only motion vector candidates from blocks in a common sub-picture video signal with the current sub-picture are added to the candidate list. Hence, motion vectors from blocks in other sub-picture video signals are not added to the candidate list and are not selected for the current sub-picture.

At step 1213, the sub-picture bitstreams created by encoding the sub-picture video signals are further composed as a plurality of sub-picture tracks, for example in ISOBMFF. The sub-picture tracks are further constrained to prevent timing mismatches when employing viewport dependent coding. Specifically, the sub-picture tracks can be constrained to include a common number of media samples per track. This can be done by ensuring all the sub-picture video signals have the same number of sub-pictures regardless of resolution even when the sub-picture video signals are included in different sub-picture tracks. Further, the tracks are all constrained to include a common presentation time. This can be done by ensuring that all tracks have the same frame rate, the same number of frames, and/or that all tracks play for the same duration regardless of resolution. The sub-picture tracks can be constrained to employ consistent picture order count values. Specifically, each sub-picture in each sub-picture video signal may be assigned a picture order count value. Further, the sub-pictures that are associated with the same frame from the spherical video signal can be assigned the same picture order count value regardless of resolution. This ensures that that media samples are designated with a common picture order count value across all sub-picture tracks. As the various timing mismatches and cross sub-picture video signal based errors related to inter-prediction are avoided by steps 1205-1213, an indication can be included in the sub-picture tracks to indicate the sub-picture tracks are conforming to a particular video profile, such as an OMAF video profile.

At step 1215, a set of sub-picture tracks are transmitted toward a decoder to support decoding and displaying as a viewport dependent virtual reality video stream over a virtual reality viewport. As noted above, sub-picture tracks can be selected and transmitted for different spatial portions of the spherical video signal at different resolution, and some spatial portions may even be omitted. This allows the spatial portions of the VR video stream/signal in and around the users viewport to be transmitted in high resolution while omitting and/or transmitting spatial portions outside of the user viewport (which are less likely to be viewed) in lower resolution. This approach results in a significantly lower file size transmitted to the user in a video streaming context. Further, the constraints employed above ensure that each sub-picture video signal/bitstream is encoded in a self-contained manner and can be decoded without artifacts regardless of differences in resolution between the sub-picture video signals.

It should be noted that viewport dependent coding can be implemented according to omnidirectional media format (OMAF) as controlled by the motion picture experts group (MPEG). Method 1200 can be implemented by including the following into OMAF related standards documents.

When the untransformed sample entry type is 'hvc2', the track shall include one or more 'scal' track references. The referred tracks shall conform to the HEVC-based viewport-independent OMAF video profile or the HEVC-based viewport-dependent OMAF video profile, and for each sub-picture bitstream carried in a referred track, the following constraints apply. 1) There shall be no sample values outside the picture that are referenced for inter prediction. 2) For prediction units located on the right-side picture boundary except the last one at the bottom-right corner of the picture, the following applies when CuPredMode[xPb][yPb] is equal to MODE_INTER, where (xPb, yPb) specifies the top-left sample of the corresponding luma prediction block relative to the top-left sample of the current picture. With the number of spatial merging candidates numSpatialMergeCand derived as follows:

numSpatialMergeCand=availableFlagA$_0$+availableFlagA$_1$+availableFlagB$_0$+availableFlagB$_1$+availableFlagB$_2$ Where availableFlagA0, availableFlagA1, availableFlagB0, availableFlagB1, and availableFlagB2 are the output of the derivation process for spatial merging candidates specified in clause 8.5.3.2.3 of ISO/IEC 23008-2, the following applies. If numSpatialMergeCand is equal to 0, merge_flag[xPb][yPb] shall be equal to 0. Otherwise (numSpatialMergeCand is greater than 0), merge_idx[xPb][yPb] shall be in the range of 0 to numSpatialMergeCand−1, inclusive. With the number of spatial motion vector predictor candidates numSpatialMvpCand derived as follows:

if (availableFlagLXA)

numSpatialMvpCand=availableFlagLXA+

((mvLXA!=mvLXB)?availableFlagLXB:0)

else numSpatialMvpCand=availableFlagLXB

Where availableFlagLXA, availableFlagLXB, mvLXA, and mvLXB are the output of the derivation process for motion vector predictor candidates from neighbouring prediction unit partitions specified in clause 8.5.3.2.7 of ISO/IEC 23008-2, the following applies. If numSpatialMvpCand is equal to 0, mvp_l0_flag[xPb][yPb] and mvp_l1_flag[xPb][yPb] shall be equal to 1. Otherwise (numSpatialMvpCand is greater than 0), mvp_l0_flag[xPb][yPb] and mvp_l1_flag[xPb][yPb] shall be in the range of 0 to numSpatialMvpCand−1, inclusive.

NOTE—The first constraint restricts such that motion vectors point to full-sample locations inside the picture and to fractional-sample locations that require only full-sample locations inside the picture for interpolation. Note that in the above constraints and the previous sentence, a sub-picture becomes a picture within the context of one sub-picture bitstream. The second constraint restricts that, when the sub-picture bitstream of the referred track together with other sub-picture bitstreams carried in other referred tracks are reconstructed into one conforming bitstream, in decoding of the entire reconstructed bitstream, for blocks of the sub-picture of this sub-picture bitstream, there won't be motion vector candidates for temporal motion vector prediction derived from blocks outside the "sub-picture". 3) The value of entropy_coding_sync_enabled_flag in the active PPS shall be equal to 0.

Additionally, for the referred tracks, the constraints apply. 1) The tracks shall contain the same number of media samples. 2) The samples with the same sample number across tracks shall have the same presentation time. 3) The pictures carried in the samples with the same sample number across tracks shall have the same value of picture order count, e.g., PicOrderCntVal. In some examples, the following constrain also applies. 4) For each sub-picture, the width and height shall be an integral multiple of 64, the width shall be greater than or equal to 256, and the height shall be greater than or equal to 64.

Figure 13:
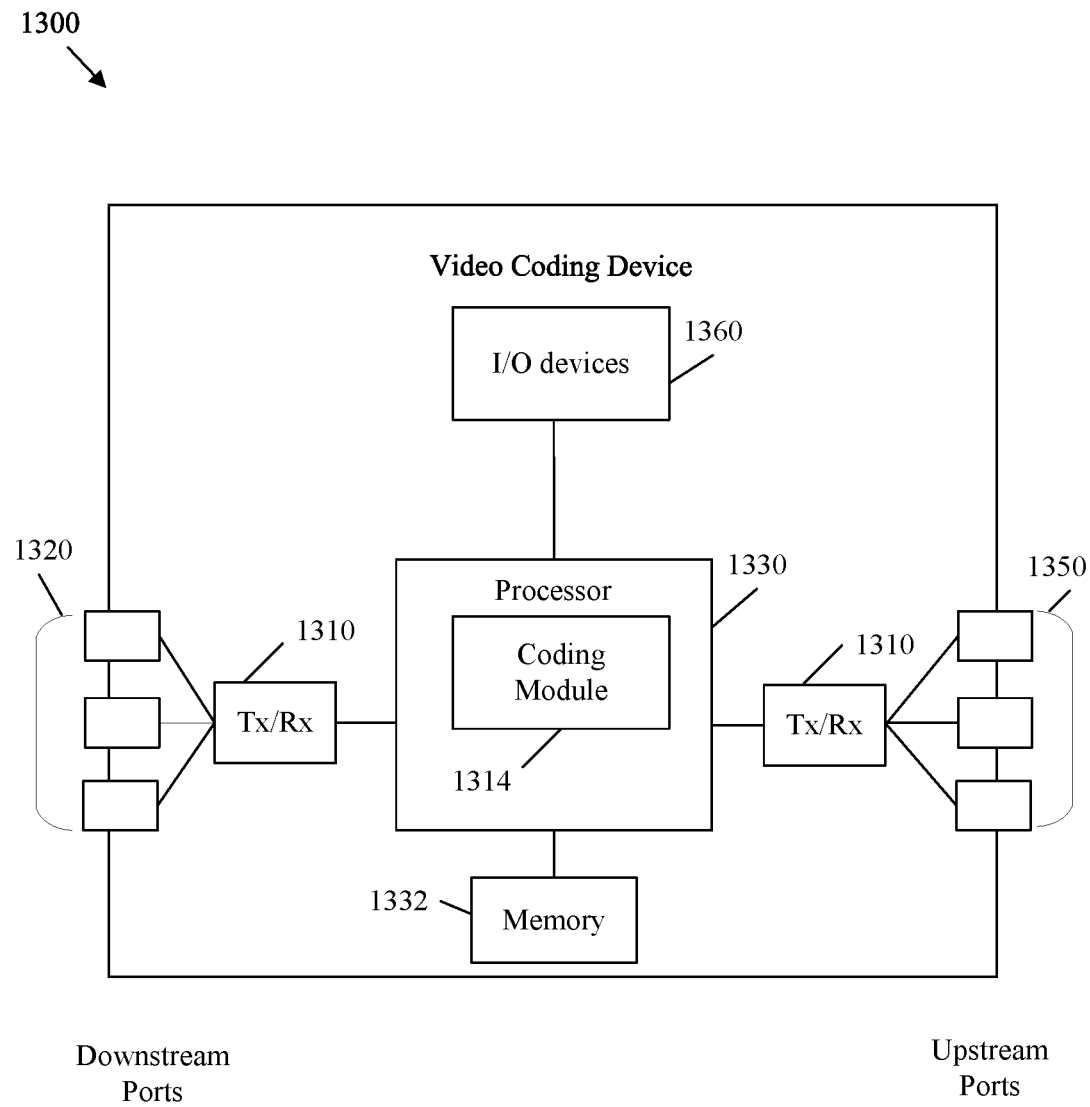
FIG. 13 is a schematic diagram of an example video coding device.

FIG. 13 is a schematic diagram of an example video coding device 1300. The video coding device 1300 is suitable for implementing the disclosed examples/embodiments as described herein. The video coding device 1300 comprises downstream ports 1320, upstream ports 1350, and/or transceiver units (Tx/Rx) 1310, including transmitters and/or receivers for communicating data upstream and/or downstream over a network. The video coding device 1300 also includes a processor 1330 including a logic unit and/or central processing unit (CPU) to process the data and a memory 1332 for storing the data. The video coding device 1300 may also comprise optical-to-electrical (OE) components, electrical-to-optical (EO) components, and/or wireless communication components coupled to the upstream ports 1350 and/or downstream ports 1320 for communication of data via optical or wireless communication networks. The video coding device 1300 may also include input and/or output (I/O) devices 1360 for communicating data to and from a user. The I/O devices 1360 may include output devices such as a display for displaying video data, speakers for outputting audio data, etc. The I/O devices 1360 may also include input devices, such as a keyboard, mouse, trackball, etc., and/or corresponding interfaces for interacting with such output devices.

The processor 1330 is implemented by hardware and software. The processor 1330 may be implemented as one or more CPU chips, cores (e.g., as a multi-core processor), field-programmable gate arrays (FPGAs), application specific integrated circuits (ASICs), and digital signal processors (DSPs). The processor 1330 is in communication with the downstream ports 1320, Tx/Rx 1310, upstream ports 1350, and memory 1332. The processor 1330 comprises a coding module 1314. The coding module 1314 implements the disclosed embodiments described above, such as methods 200, 300, 1200, and/or combinations thereof. For example, the coding module 1314 can implement an encoder, such as encoder 103, codec system 400, and/or encoder 500, in order to encode the sub-picture video signals, such as sub-picture video signals 701 and 703, via viewport dependent coding. As another example, the coding module 1314 can implement a decoder, such as decoder 107, codec system 400, and/or decoder 600 for decoding the sub-picture video signals. The coding module 1314 may encode/decode such sub-picture video signals in ISOBMFF 1100. Further, the coding module 1314 may employ unidirectional inter-prediction 800, bidirectional inter-prediction 900, and/or mechanism 1000 in viewport dependent coding without creating visual artifacts due to sub-picture video signal boundaries.

Specifically, the coding module 1314 can encode and/or decode sub-picture video signals according to constraints to prevent visual artifacts. For example, coding module 1314 can encode sub-picture video signals so that blocks only reference full sample locations in the same sub-picture video signal, and hence cannot reference sample locations from other sub-picture video signals. Coding module 1314 can encode blocks using fractional sample locations in a sub-picture video signal, but only if the sample at the fractional sample location can be recreated by interpolation based solely on sample locations inside the same sub-picture bitstream. Further, coding module 1314 can ensure motion vectors from blocks in adjacent sub-picture bitstreams are not included in motion vector candidate lists. The coding module 1314 can apply these restrictions to ensure that each sub-picture bitstream can be decoded without reference to a neighbor sub-picture bitstream, and hence resolution based mismatches are avoided. The coding module 1314 can also turn off WPP, for example by setting an entropy_coding_sync_enabled_flag in each PPS to zero. Also, coding module 1314 can prevent timing mismatches between the sub-picture bitstreams by ensuring tracks containing the sub-picture video signals have the same presentation time, ensuring tracks have the same number of media samples (e.g., frames), and ensuring each sample from a common VR picture employs the same picture order count value. Hence, coding module 1314 causes the video coding device 1300 to operate with greater coding efficiency and/or by using fewer network resources by employing viewport dependent coding without creating visual artifacts and/or sacrificing visual quality of the VR video stream displayed to a user via a rendering device. As such, coding module 1314 improves the functionality of the video coding device 1300 as well as addresses problems that are specific to the video coding arts. Further, coding module 1314 effects a transformation of the video coding device 1300 to a different state. Alternatively, the coding module 1314 can be implemented as instructions stored in the memory 1332 and executed by the processor 1330 (e.g., as a computer program product stored on a non-transitory medium).

The memory 1332 comprises one or more memory types such as disks, tape drives, solid-state drives, read only memory (ROM), random access memory (RAM), flash memory, ternary content-addressable memory (TCAM), static random-access memory (SRAM), etc. The memory 1332 may be used as an over-flow data storage device, to store programs when such programs are selected for execution, and to store instructions and data that are read during program execution.

Figure 14:
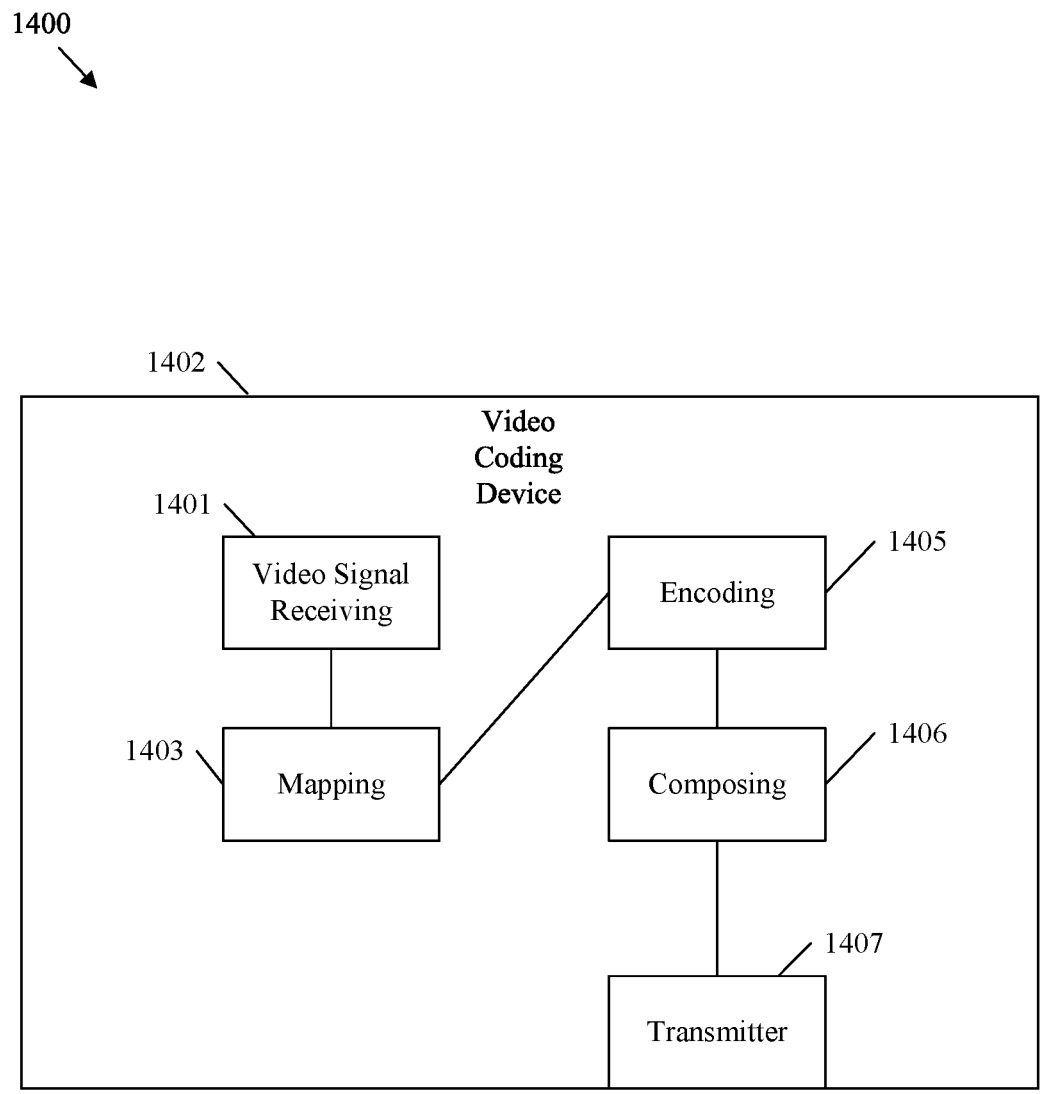
FIG. 14 is a schematic diagram of an example video coding device for encoding sub-picture bitstreams.

FIG. 14 is a schematic diagram of an example video coding device 1400 for encoding sub-picture bitstreams. The video coding device 1400 implements the disclosed embodiments described above, such as coding module 1314, methods 200, 300, 1200, and/or combinations thereof. For example, the coding module 131 video coding device 1400 can implement an encoder, such as encoder 103, codec system 400, and/or encoder 500, in order to encode the sub-picture video signals, such as sub-picture video signals 701 and 703, via viewport dependent coding. The video coding device 1400 may encode such sub-picture video signals in ISOBMFF 1100. Further, the video coding device 1400 may employ unidirectional inter-prediction 800, bidirectional inter-prediction 900, and/or mechanism 1000 in viewport dependent coding without creating visual artifacts due to sub-picture video signal boundaries.

The video coding device 1400 includes a video signal receiving module 1401 for receiving a spherical video signal stitched from multiple directional video signals. The video coding device 1400 also includes a mapping module 1403 for mapping the spherical video signal into a plurality of sub-picture video signals each containing a sequence of sub-pictures. The video coding device 1400 also includes an encoding module 1405 for encoding the plurality of sub-picture video signals as a plurality of sub-picture bitstreams such that, when decoded at a decoder, a value of each sample in each sub-picture is identical to a value of a corresponding sample in a decoded entire picture composed from the sub-pictures. The video coding device 1400 also includes a composing module 1406 for composing the plurality of sub-picture bitstreams into a plurality of sub-picture tracks, and indicating the sub-picture tracks are conforming to a particular video profile. The video coding device 1400 also includes a transmitting module 1407 for transmitting a set of the plurality of sub-picture tracks toward a decoder to support decoding and displaying a virtual reality video viewport.

Figure 15:
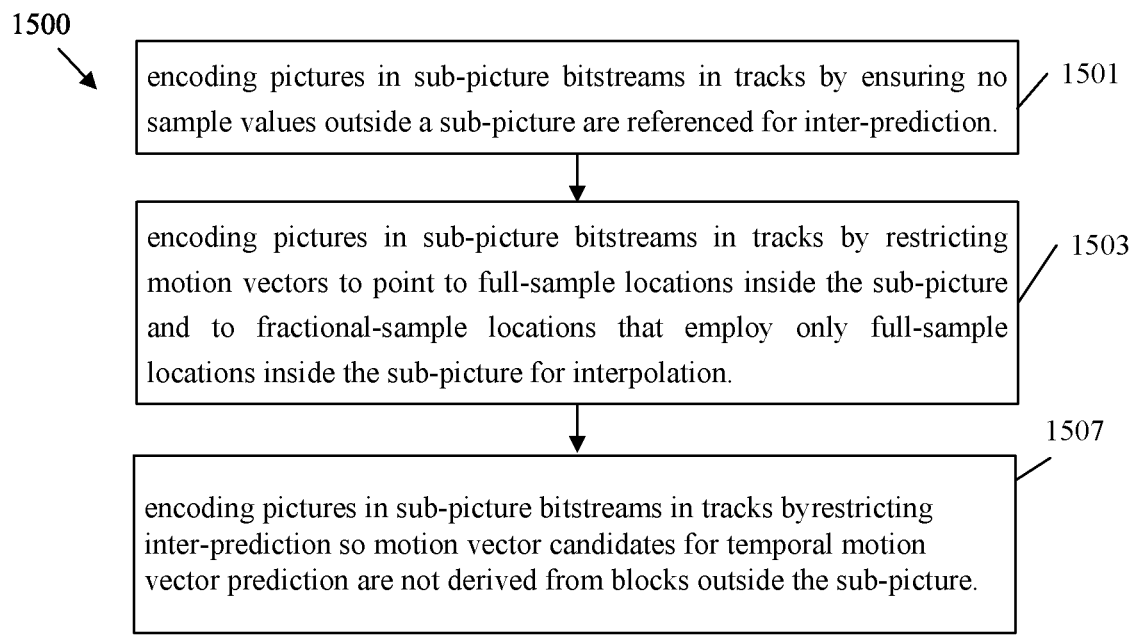
FIG. 15 is a flowchart of another example method of encoding sub-picture bitstreams.

FIG. 15 is a flowchart of another example method 1500 of encoding sub-picture bitstreams. In method 1500 an encoder encodes pictures in sub-picture bitstreams in tracks by ensuring no sample values outside a sub-picture are referenced for inter-prediction at step 1501. Further, the encoder encodes pictures in sub-picture bitstreams in tracks at step 1503 by restricting motion vectors to point to full-sample locations inside the sub-picture and to fractional-sample locations that employ only full-sample locations inside the sub-picture for interpolation. In addition, the encoder encodes pictures in sub-picture bitstreams in tracks at step 1505 by restricting inter-prediction so motion vector candidates for temporal motion vector prediction are not derived from blocks outside the sub-picture. It should be noted that steps 1501, 1503, and 1505 are depicted in order for purposes of clarity of discussion. However, steps 1501, 1503, and 1505 can be performed in any order including simultaneously and/or substantially contemporaneously. Also encoding pictures in sub-picture bitstreams in tracks may further include that when multiple tiles are present in a first sub-picture bitstream, a value of an entropy_coding_sync_enabled_flag in a PPS is set zero for each sub-picture bitstream carried in a corresponding track. In addition, encoding pictures in sub-picture bitstreams in tracks may also include requiring tracks to contain the same number of media samples. Further, encoding pictures in sub-picture bitstreams in tracks may further include requiring that samples with the same sample number across a plurality of tracks have the same presentation time. Also, encoding pictures in sub-picture bitstreams in tracks may further include that sub-pictures carried in media samples with the same sample number across the tracks have the same picture order count value.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by an encoder, the method comprising:
    encoding, by a processor at the encoder, pictures in sub-picture bitstreams in tracks by:
        ensuring no sample values outside a sub-picture are referenced for inter-prediction;
        restricting motion vectors to point to full-sample locations inside the sub-picture and to fractional-sample locations that employ only the full-sample locations inside the sub-picture for interpolation;
        restricting inter-prediction so motion vector candidates for temporal motion vector prediction are not derived from blocks outside the sub-picture; and
        requiring that samples with a same sample number across a plurality of tracks have a same presentation time.

2. The method of claim 1, wherein encoding pictures in sub-picture bitstreams in tracks further includes that when multiple tiles are present in a first sub-picture bitstream, a value of an entropy_coding_sync_enabled_flag in a picture parameter set (PPS) is set to zero for each sub-picture bitstream carried in a corresponding track.

3. The method of claim 1, wherein encoding pictures in sub-picture bitstreams in tracks further includes requiring tracks to contain a same number of media samples.

4. The method of claim 1, wherein encoding pictures in sub-picture bitstreams in tracks further includes that sub-pictures carried in media samples with the same sample number across the tracks have a same picture order count value.

5. A video coding device comprising:
    a processor configured to encode pictures in sub-picture bitstreams in tracks by:
        ensuring no sample values outside a sub-picture are referenced for inter-prediction;
        restricting motion vectors to point to full-sample locations inside the sub-picture and to fractional-sample locations that employ only the full-sample locations inside the sub-picture for interpolation;
        restricting inter-prediction so motion vector candidates for temporal motion vector prediction are not derived from blocks outside the sub-picture; and
        requiring that samples with a same sample number across a plurality of tracks have a same presentation time.

6. The video coding device of claim 5, wherein encoding pictures in sub-picture bitstreams in tracks further includes that when multiple tiles are present in a first sub-picture bitstream, a value of an entropy_coding_sync_enabled_flag in a picture parameter set (PPS) is set to zero for each sub-picture bitstream carried in a corresponding track.

7. The video coding device of claim 5, wherein encoding pictures in sub-picture bitstreams in tracks further includes requiring tracks to contain a same number of media samples.

8. The video coding device of claim 5, wherein encoding pictures in sub-picture bitstreams in tracks further includes that sub-pictures carried in media samples with the same sample number across the tracks have a same picture order count value.

9. A non-transitory computer readable medium comprising a computer program product for use by a video coding device, the computer program product comprising computer executable instructions stored on the non-transitory computer readable medium such that when executed by a processor cause the video coding device to:
    encode pictures in sub-picture bitstreams in tracks by:
        ensuring no sample values outside a sub-picture are referenced for inter-prediction;
        restricting motion vectors to point to full-sample locations inside the sub-picture and to fractional-sample locations that employ only the full-sample locations inside the sub-picture for interpolation;
        restricting inter-prediction so motion vector candidates for temporal motion vector prediction are not derived from blocks outside the sub-picture; and
        requiring that sub-pictures carried in media samples with a same sample number across the tracks have a same picture order count value.

10. The non-transitory computer readable medium of claim 9, wherein encoding pictures in sub-picture bitstreams in tracks further includes that when multiple tiles are present in a first sub-picture bitstream, a value of an entropy_coding_sync_enabled_flag in a picture parameter set (PPS) is set to zero for each sub-picture bitstream carried in a corresponding track.

11. The non-transitory computer readable medium of claim 9, wherein encoding pictures in sub-picture bitstreams in tracks further includes requiring tracks to contain a same number of media samples.

12. The non-transitory computer readable medium of claim 9, wherein encoding pictures in sub-picture bitstreams in tracks further includes requiring that samples with the same sample number across a plurality of tracks have a same presentation time.

* * * * *